(12) United States Patent
Miles

(10) Patent No.: US 9,110,289 B2
(45) Date of Patent: *Aug. 18, 2015

(54) DEVICE FOR MODULATING LIGHT WITH MULTIPLE ELECTRODES

(75) Inventor: Mark W. Miles, Atlanta, GA (US)

(73) Assignee: QUALCOMM MEMS TECHNOLOGIES, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/005,926

(22) Filed: Jan. 13, 2011

(65) Prior Publication Data

US 2011/0170166 A1   Jul. 14, 2011

Related U.S. Application Data

(60) Continuation of application No. 11/698,721, filed on Jan. 26, 2007, now Pat. No. 7,872,792, which is a continuation of application No. 11/056,571, filed on Feb. 11, 2005, now Pat. No. 7,379,227, which is a continuation of application No. 09/966,843, filed on Sep. 28, 2001, now Pat. No. 6,867,896, which is a division of application No. 09/056,975, filed on Apr. 8, 1998, now Pat. No. 6,674,562.

(51) Int. Cl.
*G02B 26/00* (2006.01)
*G02B 26/08* (2006.01)
(Continued)

(52) U.S. Cl.
CPC .......... *G02B 26/0833* (2013.01); *G02B 26/001* (2013.01); *G02B 26/02* (2013.01); *G02B 26/0841* (2013.01); *G09G 3/22* (2013.01); *G09G 3/3466* (2013.01); *G02B 5/201* (2013.01); *G02B 19/0019* (2013.01); *G02B 26/00* (2013.01); *G02B 26/007* (2013.01); *G02B 26/06* (2013.01); *G02B 26/0816* (2013.01);
(Continued)

(58) Field of Classification Search
CPC .. G02B 26/0833; G02B 26/001; G02B 26/02; G02B 26/00; G02B 26/06; G02B 26/0841; G02B 26/007; G02B 26/0816; G02B 27/0068; G02B 19/0019; G02B 26/0825; G02B 5/201; G09G 3/3466; G09G 2300/0469; G09G 2300/08; G09G 2300/0426; G09G 3/3433; G02F 1/01; G02F 1/0128; G02F 2203/12
USPC ......... 359/223, 224, 290–292, 295, 298, 318; 345/85, 108; 348/770, 771
See application file for complete search history.

(56) References Cited

U.S. PATENT DOCUMENTS 2,518,647 A    8/1950    Teeple et al.
2,534,846 A    12/1950   Ambrose et al.
(Continued)

FOREIGN PATENT DOCUMENTS

CA    2490975 A1    1/2004
CH    680534        9/1992
(Continued)

OTHER PUBLICATIONS

Aratani et al., Process and Design Considerations for Surface Micromachined Beams for a Tuneable Interferometer Array in Silicon, Proc. IEEE Microelectromechanical Workshop, Fort Lauderdale, FL, pp. 230-235 (Feb. 1993).
(Continued)

*Primary Examiner* — Evelyn A Lester
(74) *Attorney, Agent, or Firm* — Knobbe Martens Olson & Bear LLP

(57) ABSTRACT

Improvements in an interferometric modulator that has a cavity defined by two walls.

23 Claims, 15 Drawing Sheets

(51) Int. Cl.
  G02F 1/29 (2006.01)
  G02B 26/02 (2006.01)
  G09G 3/22 (2006.01)
  G02B 26/06 (2006.01)
  G02B 5/20 (2006.01)
  G02B 19/00 (2006.01)
  G02F 1/01 (2006.01)
  G09G 3/34 (2006.01)
  G02B 27/00 (2006.01)
  G09G 3/20 (2006.01)

(52) U.S. Cl.
  CPC ........ G02B 26/0825 (2013.01); G02B 27/0068 (2013.01); G02F 1/01 (2013.01); G02F 1/0128 (2013.01); G02F 2203/12 (2013.01); G09G 3/2014 (2013.01); G09G 3/3433 (2013.01); G09G 2300/0426 (2013.01); G09G 2300/0469 (2013.01); G09G 2300/08 (2013.01); G09G 2300/088 (2013.01); G09G 2300/0809 (2013.01); G09G 2300/0842 (2013.01); Y10T 29/49002 (2015.01); Y10T 29/4913 (2015.01)

(56) References Cited

U.S. PATENT DOCUMENTS

| | | |
|---|---|---|
| 2,588,792 A | 3/1952 | Wilson |
| 2,590,906 A | 4/1952 | Tripp |
| 2,677,714 A | 5/1954 | Auwarter |
| 3,037,189 A | 5/1962 | Barrett et al. |
| 3,184,600 A | 5/1965 | Potter |
| 3,210,757 A | 10/1965 | Jacob |
| 3,247,392 A | 4/1966 | Thelen |
| 3,296,530 A | 1/1967 | William |
| 3,371,345 A | 2/1968 | Bernard |
| 3,410,363 A | 11/1968 | Edmund |
| 3,439,973 A | 4/1969 | Bernt et al. |
| 3,443,854 A | 5/1969 | Herbert |
| 3,448,334 A | 6/1969 | John |
| 3,653,741 A | 4/1972 | Alvin |
| 3,656,836 A | 4/1972 | Baudoin et al. |
| 3,661,461 A | 5/1972 | Dessauer |
| 3,679,313 A | 7/1972 | Rosenberg |
| 3,701,586 A | 10/1972 | Goetz |
| 3,725,868 A | 4/1973 | Malmer et al. |
| 3,728,030 A | 4/1973 | Hawes |
| 3,746,785 A | 7/1973 | Goodrich |
| 3,813,265 A | 5/1974 | Marks |
| 3,886,310 A | 5/1975 | Guldberg |
| 3,924,929 A | 12/1975 | Holmen et al. |
| 3,955,190 A | 5/1976 | Teraishi |
| 3,955,880 A | 5/1976 | Lierke |
| 3,982,239 A | 9/1976 | Sherr |
| 4,087,810 A | 5/1978 | Hung et al. |
| 4,099,854 A | 7/1978 | Decker et al. |
| 4,125,868 A | 11/1978 | Hruby et al. |
| 4,154,219 A | 5/1979 | Gupta et al. |
| 4,158,718 A | 6/1979 | Kehl et al. |
| 4,190,488 A | 2/1980 | Winters |
| 4,196,396 A | 4/1980 | Smith |
| 4,200,472 A | 4/1980 | Chappell et al. |
| 4,215,244 A | 7/1980 | Gutleber |
| 4,228,437 A | 10/1980 | Shelton |
| 4,282,862 A | 8/1981 | Soleau |
| 4,287,449 A | 9/1981 | Takeda et al. |
| 4,299,450 A | 11/1981 | Funada et al. |
| 4,347,983 A | 9/1982 | Bodai |
| 4,375,312 A | 3/1983 | Tangonan |
| 4,377,324 A | 3/1983 | Durand et al. |
| 4,378,567 A | 3/1983 | Mir |
| 4,389,096 A | 6/1983 | Hori et al. |
| 4,392,711 A | 7/1983 | Moraw et al. |
| 4,400,577 A | 8/1983 | Spear |
| 4,403,248 A | 9/1983 | te Velde |
| 4,408,181 A | 10/1983 | Nakayama |
| 4,421,381 A | 12/1983 | Ueda et al. |
| 4,425,572 A | 1/1984 | Takafuji et al. |
| 4,441,789 A | 4/1984 | Pohlack |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,484,179 A | 11/1984 | Kasday |
| 4,497,974 A | 2/1985 | Deckman et al. |
| 4,498,953 A | 2/1985 | Cook et al. |
| 4,500,171 A | 2/1985 | Penz et al. |
| 4,518,959 A | 5/1985 | Ueda et al. |
| 4,519,676 A | 5/1985 | te Velde |
| 4,531,126 A | 7/1985 | Sadones |
| 4,560,435 A | 12/1985 | Brown et al. |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,626,840 A | 12/1986 | Glasper et al. |
| 4,633,031 A | 12/1986 | Todorof |
| 4,655,554 A | 4/1987 | Armitage |
| 4,662,746 A | 5/1987 | Hornbeck |
| 4,663,083 A | 5/1987 | Marks |
| 4,666,254 A | 5/1987 | Itoh et al. |
| 4,672,254 A | 6/1987 | Dolat et al. |
| 4,681,403 A | 7/1987 | Te Velde et al. |
| 4,688,068 A | 8/1987 | Chaffin et al. |
| 4,705,361 A | 11/1987 | Frazier et al. |
| 4,709,995 A | 12/1987 | Kuribayashi et al. |
| 4,710,732 A | 12/1987 | Hornbeck |
| 4,748,366 A | 5/1988 | Taylor |
| 4,779,959 A | 10/1988 | Saunders |
| 4,786,128 A | 11/1988 | Birnbach |
| 4,790,635 A | 12/1988 | Apsley |
| 4,822,993 A | 4/1989 | Dillon et al. |
| 4,825,262 A | 4/1989 | Mallinson |
| 4,832,459 A | 5/1989 | Harper et al. |
| 4,850,682 A | 7/1989 | Gerritsen |
| 4,856,863 A | 8/1989 | Sampsell et al. |
| 4,857,978 A | 8/1989 | Goldburt et al. |
| 4,859,060 A | 8/1989 | Katagiri et al. |
| 4,863,224 A | 9/1989 | Afian et al. |
| 4,863,245 A | 9/1989 | Roxlo |
| 4,864,290 A | 9/1989 | Waters |
| 4,880,493 A | 11/1989 | Ashby et al. |
| 4,896,033 A | 1/1990 | Gautier |
| 4,900,136 A | 2/1990 | Goldburt et al. |
| 4,900,395 A | 2/1990 | Syverson et al. |
| 4,918,577 A | 4/1990 | Furudate |
| 4,925,259 A | 5/1990 | Emmett |
| 4,937,496 A | 6/1990 | Neiger et al. |
| 4,952,034 A | 8/1990 | Azusawa et al. |
| 4,954,789 A | 9/1990 | Sampsell |
| 4,956,213 A | 9/1990 | Masuda |
| 4,956,619 A | 9/1990 | Hornbeck |
| 4,961,617 A | 10/1990 | Shahidi et al. |
| 4,963,245 A | 10/1990 | Weetall |
| 4,963,859 A | 10/1990 | Parks |
| 4,965,562 A | 10/1990 | Verhulst |
| 4,973,131 A | 11/1990 | Carnes |
| 4,974,942 A | 12/1990 | Gross et al. |
| 4,977,009 A | 12/1990 | Anderson et al. |
| 4,980,775 A | 12/1990 | Brody |
| 4,982,184 A | 1/1991 | Kirkwood |
| 4,985,312 A | 1/1991 | Furuya et al. |
| 5,018,256 A | 5/1991 | Hornbeck |
| 5,022,745 A | 6/1991 | Zayhowski et al. |
| 5,028,939 A | 7/1991 | Hornbeck et al. |
| 5,034,351 A | 7/1991 | Sun et al. |
| 5,037,173 A | 8/1991 | Sampsell et al. |
| 5,044,736 A | 9/1991 | Jaskie et al. |
| 5,050,946 A | 9/1991 | Hathaway et al. |
| 5,055,833 A | 10/1991 | Hehlen et al. |
| 5,061,049 A | 10/1991 | Hornbeck |
| 5,062,689 A | 11/1991 | Koehler |
| 5,075,796 A | 12/1991 | Schildkraut et al. |
| 5,078,479 A | 1/1992 | Vuilleumier |

(56) References Cited

U.S. PATENT DOCUMENTS

| | | |
|---|---|---|
| 5,079,544 A | 1/1992 | DeMond et al. |
| 5,083,857 A | 1/1992 | Hornbeck |
| 5,091,983 A | 2/1992 | Lukosz |
| 5,096,279 A | 3/1992 | Hornbeck et al. |
| 5,099,353 A | 3/1992 | Hornbeck |
| 5,110,370 A | 5/1992 | Vogeli et al. |
| 5,114,226 A | 5/1992 | Goodwin et al. |
| 5,123,247 A | 6/1992 | Nelson |
| 5,124,834 A | 6/1992 | Cusano et al. |
| 5,126,836 A | 6/1992 | Um |
| 5,136,669 A | 8/1992 | Gerdt |
| 5,142,405 A | 8/1992 | Hornbeck |
| 5,142,414 A | 8/1992 | Koehler |
| 5,148,157 A | 9/1992 | Florence |
| 5,151,585 A | 9/1992 | Siebert |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,170,283 A | 12/1992 | O'Brien et al. |
| 5,172,262 A | 12/1992 | Hornbeck |
| 5,179,274 A | 1/1993 | Sampsell |
| 5,185,660 A | 2/1993 | Um |
| 5,190,637 A | 3/1993 | Guckel |
| 5,192,395 A | 3/1993 | Boysel et al. |
| 5,192,946 A | 3/1993 | Thompson et al. |
| 5,198,644 A | 3/1993 | Pfeiffer et al. |
| 5,206,629 A | 4/1993 | DeMond et al. |
| 5,206,632 A | 4/1993 | Dupont et al. |
| 5,206,747 A | 4/1993 | Wiley et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,218,472 A | 6/1993 | Jozefowicz et al. |
| 5,226,099 A | 7/1993 | Mignardi et al. |
| 5,227,900 A | 7/1993 | Inaba et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,244,707 A | 9/1993 | Shores |
| 5,252,142 A | 10/1993 | Matsuyama et al. |
| 5,254,980 A | 10/1993 | Hendrix et al. |
| 5,255,093 A | 10/1993 | Topper et al. |
| 5,261,970 A | 11/1993 | Landis et al. |
| 5,262,667 A | 11/1993 | Hirai |
| 5,272,473 A | 12/1993 | Thompson et al. |
| 5,278,652 A | 1/1994 | Urbanus et al. |
| 5,280,277 A | 1/1994 | Hornbeck |
| 5,285,196 A | 2/1994 | Gale |
| 5,287,096 A | 2/1994 | Thompson et al. |
| 5,287,215 A | 2/1994 | Warde et al. |
| 5,291,314 A | 3/1994 | Agranat et al. |
| 5,293,272 A | 3/1994 | Jannson et al. |
| 5,296,950 A | 3/1994 | Lin et al. |
| 5,304,419 A | 4/1994 | Shores |
| 5,305,640 A | 4/1994 | Boysel et al. |
| 5,311,360 A | 5/1994 | Bloom et al. |
| 5,312,512 A | 5/1994 | Allman et al. |
| 5,312,513 A | 5/1994 | Florence et al. |
| 5,315,370 A | 5/1994 | Bulow |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,337,191 A | 8/1994 | Austin |
| 5,339,116 A | 8/1994 | Urbanus et al. |
| 5,339,179 A | 8/1994 | Rudisill et al. |
| 5,341,242 A | 8/1994 | Gilboa et al. |
| 5,345,322 A | 9/1994 | Fergason |
| 5,345,328 A | 9/1994 | Fritz et al. |
| 5,353,114 A | 10/1994 | Hansen |
| 5,355,181 A | 10/1994 | Ashizaki et al. |
| 5,355,357 A | 10/1994 | Yamamori et al. |
| 5,356,488 A | 10/1994 | Hezel |
| 5,358,601 A | 10/1994 | Cathey |
| 5,358,806 A | 10/1994 | Haraichi et al. |
| 5,361,383 A | 11/1994 | Chang et al. |
| 5,365,283 A | 11/1994 | Doherty et al. |
| 5,381,040 A | 1/1995 | Sun et al. |
| 5,381,232 A | 1/1995 | Van Wijk |
| 5,381,253 A | 1/1995 | Sharp et al. |
| 5,396,593 A | 3/1995 | Mori et al. |
| 5,398,125 A | 3/1995 | Willett et al. |
| 5,398,170 A | 3/1995 | Lee |
| 5,401,983 A | 3/1995 | Jokerst et al. |
| 5,411,769 A | 5/1995 | Hornbeck |
| 5,422,310 A | 6/1995 | Ito |
| 5,444,566 A | 8/1995 | Gale et al. |
| 5,446,479 A | 8/1995 | Thompson et al. |
| 5,448,314 A | 9/1995 | Heimbuch et al. |
| 5,448,659 A | 9/1995 | Tsutsui et al. |
| 5,450,205 A | 9/1995 | Sawin et al. |
| 5,452,024 A | 9/1995 | Sampsell |
| 5,452,138 A | 9/1995 | Mignardi et al. |
| 5,452,385 A | 9/1995 | Izumi et al. |
| 5,454,904 A | 10/1995 | Ghezzo et al. |
| 5,454,906 A | 10/1995 | Baker et al. |
| 5,457,493 A | 10/1995 | Leddy et al. |
| 5,457,566 A | 10/1995 | Sampsell et al. |
| 5,457,900 A | 10/1995 | Roy et al. |
| 5,459,602 A | 10/1995 | Sampsell |
| 5,459,610 A | 10/1995 | Bloom et al. |
| 5,461,411 A | 10/1995 | Florence et al. |
| 5,467,417 A | 11/1995 | Nakamura et al. |
| 5,471,341 A | 11/1995 | Warde et al. |
| 5,474,865 A | 12/1995 | Vasudev |
| 5,481,385 A | 1/1996 | Zimmerman et al. |
| 5,483,260 A | 1/1996 | Parks et al. |
| 5,485,304 A | 1/1996 | Kaeriyama |
| 5,488,505 A | 1/1996 | Engle |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,508,841 A | 4/1996 | Lin et al. |
| 5,515,076 A | 5/1996 | Thompson et al. |
| 5,515,184 A | 5/1996 | Caulfield et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,526,951 A | 6/1996 | Bailey et al. |
| 5,528,707 A | 6/1996 | Sullivan et al. |
| 5,530,240 A | 6/1996 | Larson et al. |
| 5,535,047 A | 7/1996 | Hornbeck |
| 5,544,268 A | 8/1996 | Bischel et al. |
| 5,548,301 A | 8/1996 | Kornher et al. |
| 5,550,373 A | 8/1996 | Cole et al. |
| 5,551,293 A | 9/1996 | Boysel et al. |
| 5,552,924 A | 9/1996 | Tregilgas |
| 5,552,925 A | 9/1996 | Worley |
| 5,555,160 A | 9/1996 | Tawara et al. |
| 5,559,358 A | 9/1996 | Burns et al. |
| 5,561,523 A | 10/1996 | Blomberg et al. |
| 5,563,398 A | 10/1996 | Sampsell |
| 5,567,334 A | 10/1996 | Baker et al. |
| 5,569,332 A | 10/1996 | Glatfelter et al. |
| 5,569,565 A | 10/1996 | Kawakami et al. |
| 5,570,135 A | 10/1996 | Gove et al. |
| 5,578,140 A | 11/1996 | Yogev et al. |
| 5,578,976 A | 11/1996 | Yao |
| 5,579,149 A | 11/1996 | Moret et al. |
| 5,580,144 A | 12/1996 | Stroomer |

(56) References Cited

U.S. PATENT DOCUMENTS

| | | |
|---|---|---|
| 5,581,272 A | 12/1996 | Conner et al. |
| 5,583,688 A | 12/1996 | Hornbeck |
| 5,589,852 A | 12/1996 | Thompson et al. |
| 5,591,379 A | 1/1997 | Shores |
| 5,592,332 A | 1/1997 | Nishio et al. |
| 5,594,830 A | 1/1997 | Winston et al. |
| 5,597,736 A | 1/1997 | Sampsell |
| 5,598,565 A | 1/1997 | Reinhardt |
| 5,600,383 A | 2/1997 | Hornbeck |
| 5,602,671 A | 2/1997 | Hornbeck |
| 5,604,607 A | 2/1997 | Mirzaoff |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,612,713 A | 3/1997 | Bhuva et al. |
| 5,614,937 A | 3/1997 | Nelson |
| 5,619,019 A | 4/1997 | Yoshimura et al. |
| 5,619,059 A | 4/1997 | Li et al. |
| 5,619,061 A | 4/1997 | Goldsmith et al. |
| 5,619,365 A | 4/1997 | Rhoads et al. |
| 5,619,366 A | 4/1997 | Rhoads et al. |
| 5,629,790 A | 5/1997 | Neukermans et al. |
| 5,633,652 A | 5/1997 | Kanbe et al. |
| 5,633,739 A | 5/1997 | Matsuyama et al. |
| 5,636,052 A | 6/1997 | Arney et al. |
| 5,636,185 A | 6/1997 | Brewer et al. |
| 5,638,084 A | 6/1997 | Kalt |
| 5,638,946 A | 6/1997 | Zavracky |
| 5,641,391 A | 6/1997 | Hunter et al. |
| 5,646,729 A | 7/1997 | Koskinen et al. |
| 5,646,768 A | 7/1997 | Kaeriyama |
| 5,647,036 A | 7/1997 | Deacon et al. |
| 5,650,834 A | 7/1997 | Nakagawa et al. |
| 5,650,865 A | 7/1997 | Smith |
| 5,650,881 A | 7/1997 | Hornbeck |
| 5,654,741 A | 8/1997 | Sampsell et al. |
| 5,654,819 A | 8/1997 | Goossen et al. |
| 5,656,554 A | 8/1997 | Desai et al. |
| 5,657,099 A | 8/1997 | Doherty et al. |
| 5,659,374 A | 8/1997 | Gale, Jr. et al. |
| 5,659,410 A | 8/1997 | Koike et al. |
| 5,661,591 A | 8/1997 | Lin et al. |
| 5,661,592 A | 8/1997 | Bornstein et al. |
| 5,665,997 A | 9/1997 | Weaver et al. |
| 5,671,314 A | 9/1997 | Gregory et al. |
| 5,671,994 A | 9/1997 | Tai et al. |
| 5,673,128 A | 9/1997 | Ohta et al. |
| 5,673,139 A | 9/1997 | Johnson |
| 5,673,785 A | 10/1997 | Schlaak et al. |
| 5,677,783 A | 10/1997 | Bloom et al. |
| 5,683,591 A | 11/1997 | Offenberg |
| 5,683,649 A | 11/1997 | Chatterjee et al. |
| 5,686,979 A | 11/1997 | Weber et al. |
| 5,699,074 A | 12/1997 | Sutherland et al. |
| 5,699,075 A | 12/1997 | Miyamoto |
| 5,699,181 A | 12/1997 | Choi |
| 5,703,667 A | 12/1997 | Ochiai |
| 5,703,710 A | 12/1997 | Brinkman et al. |
| 5,710,656 A | 1/1998 | Goossen |
| 5,712,694 A | 1/1998 | Taira et al. |
| 5,719,068 A | 2/1998 | Suzawa et al. |
| 5,720,827 A | 2/1998 | Simmons |
| 5,726,480 A | 3/1998 | Pister |
| 5,734,177 A | 3/1998 | Sakamoto |
| 5,735,590 A | 4/1998 | Kashima et al. |
| 5,737,050 A | 4/1998 | Takahara et al. |
| 5,737,115 A | 4/1998 | Mackinlay et al. |
| 5,739,945 A | 4/1998 | Tayebati |
| 5,740,150 A | 4/1998 | Uchimaru et al. |
| 5,745,193 A | 4/1998 | Urbanus et al. |
| 5,745,281 A | 4/1998 | Yi et al. |
| 5,751,469 A | 5/1998 | Arney et al. |
| 5,754,160 A | 5/1998 | Shimizu et al. |
| 5,754,260 A | 5/1998 | Ooi et al. |
| 5,757,536 A | 5/1998 | Ricco et al. |
| 5,763,785 A | 6/1998 | Chiang |
| 5,771,116 A | 6/1998 | Miller et al. |
| 5,771,124 A | 6/1998 | Kintz et al. |
| 5,771,321 A | 6/1998 | Stern |
| 5,782,993 A | 7/1998 | Ponewash |
| 5,782,995 A | 7/1998 | Nanya et al. |
| 5,783,614 A | 7/1998 | Chen et al. |
| 5,784,189 A | 7/1998 | Bozler et al. |
| 5,784,190 A | 7/1998 | Worley |
| 5,784,212 A | 7/1998 | Hornbeck |
| 5,786,927 A | 7/1998 | Greywall et al. |
| 5,793,504 A | 8/1998 | Stoll |
| 5,795,208 A | 8/1998 | Hattori |
| 5,796,378 A | 8/1998 | Yoshida et al. |
| 5,801,084 A | 9/1998 | Beasom et al. |
| 5,805,117 A | 9/1998 | Mazurek et al. |
| 5,808,708 A | 9/1998 | Oyama et al. |
| 5,808,780 A | 9/1998 | McDonald |
| 5,808,781 A | 9/1998 | Arney et al. |
| 5,810,464 A | 9/1998 | Ishikawa et al. |
| 5,815,141 A | 9/1998 | Phares |
| 5,815,229 A | 9/1998 | Shapiro |
| 5,818,095 A | 10/1998 | Sampsell |
| 5,822,110 A | 10/1998 | Dabbaj |
| 5,822,839 A | 10/1998 | Ghosh et al. |
| 5,825,528 A | 10/1998 | Goossen |
| 5,827,215 A | 10/1998 | Yoon |
| 5,835,255 A | 11/1998 | Miles |
| 5,835,256 A | 11/1998 | Huibers |
| 5,838,484 A | 11/1998 | Goossen et al. |
| 5,842,088 A | 11/1998 | Thompson |
| 5,853,310 A | 12/1998 | Nishimura et al. |
| 5,854,872 A | 12/1998 | Tai |
| 5,867,301 A | 2/1999 | Engle |
| 5,867,302 A | 2/1999 | Fleming |
| 5,868,480 A | 2/1999 | Zeinali |
| 5,870,221 A | 2/1999 | Goossen |
| 5,877,874 A | 3/1999 | Rosenberg |
| 5,880,921 A | 3/1999 | Tham et al. |
| 5,881,449 A | 3/1999 | Ghosh et al. |
| 5,883,684 A | 3/1999 | Millikan et al. |
| 5,886,688 A | 3/1999 | Fifield et al. |
| 5,892,598 A | 4/1999 | Asakawa et al. |
| 5,894,686 A | 4/1999 | Parker et al. |
| 5,905,482 A | 5/1999 | Hughes et al. |
| 5,907,426 A | 5/1999 | Kato et al. |
| 5,912,758 A | 6/1999 | Knipe et al. |
| 5,913,594 A | 6/1999 | Iimura |
| 5,914,803 A | 6/1999 | Hwang et al. |
| 5,914,804 A | 6/1999 | Goossen |
| 5,920,417 A | 7/1999 | Johnson |
| 5,920,418 A | 7/1999 | Shiono et al. |
| 5,920,421 A | 7/1999 | Choi |
| 5,923,955 A | 7/1999 | Wong |
| 5,933,183 A | 8/1999 | Enomoto et al. |
| 5,939,795 A | 8/1999 | Yu |
| 5,945,980 A | 8/1999 | Moissev et al. |
| 5,956,106 A | 9/1999 | Petersen et al. |
| 5,959,763 A | 9/1999 | Bozler et al. |
| 5,959,777 A | 9/1999 | Whitehead |
| 5,961,198 A | 10/1999 | Hira et al. |
| 5,961,848 A | 10/1999 | Jacquet et al. |
| 5,963,788 A | 10/1999 | Barron et al. |
| 5,966,235 A | 10/1999 | Walker |
| 5,967,163 A | 10/1999 | Pan et al. |
| 5,982,540 A | 11/1999 | Koike et al. |
| 5,986,796 A | 11/1999 | Miles |
| 5,991,073 A | 11/1999 | Woodgate et al. |
| 5,994,174 A | 11/1999 | Carey et al. |
| 5,999,239 A | 12/1999 | Larson |
| 6,002,829 A | 12/1999 | Winston et al. |
| 6,008,123 A | 12/1999 | Kook et al. |
| 6,008,449 A | 12/1999 | Cole |
| 6,014,192 A | 1/2000 | Lehureau et al. |
| 6,021,007 A | 2/2000 | Murtha |
| 6,028,689 A | 2/2000 | Michalicek et al. |
| 6,028,690 A | 2/2000 | Carter et al. |

(56) References Cited

U.S. PATENT DOCUMENTS

| | | |
|---|---|---|
| 6,031,653 A | 2/2000 | Wang |
| 6,038,056 A | 3/2000 | Florence et al. |
| 6,040,937 A | 3/2000 | Miles |
| 6,046,840 A | 4/2000 | Huibers |
| 6,048,071 A | 4/2000 | Sawayama |
| 6,049,317 A | 4/2000 | Thompson et al. |
| 6,055,090 A | 4/2000 | Miles |
| 6,056,406 A | 5/2000 | Park |
| 6,061,075 A | 5/2000 | Nelson et al. |
| 6,068,382 A | 5/2000 | Fukui et al. |
| 6,072,620 A | 6/2000 | Shiono et al. |
| 6,073,034 A | 6/2000 | Jacobsen et al. |
| 6,077,722 A | 6/2000 | Jansen et al. |
| 6,088,102 A | 7/2000 | Manhart |
| 6,091,469 A | 7/2000 | Naito |
| 6,097,145 A | 8/2000 | Kastalsky et al. |
| 6,099,132 A | 8/2000 | Kaeriyama |
| 6,099,134 A | 8/2000 | Taniguchi et al. |
| 6,100,861 A | 8/2000 | Cohen et al. |
| 6,100,872 A | 8/2000 | Aratani et al. |
| 6,111,276 A | 8/2000 | Mauk |
| 6,113,239 A | 9/2000 | Sampsell et al. |
| 6,115,014 A | 9/2000 | Aoki et al. |
| 6,123,431 A | 9/2000 | Teragaki et al. |
| 6,124,851 A | 9/2000 | Jacobson |
| 6,128,077 A | 10/2000 | Jovin et al. |
| 6,142,358 A | 11/2000 | Cohn et al. |
| 6,147,680 A | 11/2000 | Tareev |
| 6,147,790 A | 11/2000 | Meier et al. |
| 6,149,190 A | 11/2000 | Galvin et al. |
| 6,151,089 A | 11/2000 | Yang et al. |
| 6,158,156 A | 12/2000 | Patrick |
| 6,160,833 A | 12/2000 | Floyd et al. |
| 6,162,657 A | 12/2000 | Schiele et al. |
| 6,165,890 A | 12/2000 | Kohl et al. |
| 6,166,319 A | 12/2000 | Matsuyama |
| 6,170,332 B1 | 1/2001 | MacDonald et al. |
| 6,171,945 B1 | 1/2001 | Mandal et al. |
| 6,172,667 B1 | 1/2001 | Sayag |
| 6,172,797 B1 | 1/2001 | Huibers |
| 6,180,428 B1 | 1/2001 | Peeters et al. |
| 6,195,196 B1 | 2/2001 | Kimura et al. |
| 6,196,691 B1 | 3/2001 | Ochiai |
| 6,201,633 B1 | 3/2001 | Peeters et al. |
| 6,204,080 B1 | 3/2001 | Hwang |
| 6,215,221 B1 | 4/2001 | Cabuz et al. |
| 6,222,511 B1 | 4/2001 | Stoller et al. |
| 6,229,084 B1 | 5/2001 | Katsu |
| 6,232,140 B1 | 5/2001 | Ferrari et al. |
| 6,232,936 B1 | 5/2001 | Gove et al. |
| 6,232,937 B1 | 5/2001 | Jacobsen et al. |
| 6,239,777 B1 | 5/2001 | Sugahara et al. |
| 6,242,989 B1 | 6/2001 | Barber et al. |
| 6,243,149 B1 | 6/2001 | Swanson et al. |
| 6,246,398 B1 | 6/2001 | Koo |
| 6,259,082 B1 | 7/2001 | Fujimoto et al. |
| 6,259,854 B1 | 7/2001 | Shinji et al. |
| 6,262,696 B1 | 7/2001 | Seraphim et al. |
| 6,262,697 B1 | 7/2001 | Stephenson |
| 6,273,577 B1 | 8/2001 | Goto et al. |
| 6,275,220 B1 | 8/2001 | Nitta |
| 6,275,326 B1 | 8/2001 | Bhalla et al. |
| 6,282,010 B1 | 8/2001 | Sulzbach et al. |
| 6,285,424 B1 | 9/2001 | Yoshida |
| 6,288,472 B1 | 9/2001 | Cabuz et al. |
| 6,288,824 B1 | 9/2001 | Kastalsky |
| 6,295,154 B1 | 9/2001 | Laor et al. |
| 6,297,811 B1 | 10/2001 | Kent et al. |
| 6,300,558 B1 | 10/2001 | Takamoto et al. |
| 6,304,297 B1 | 10/2001 | Swan |
| 6,310,729 B1 | 10/2001 | Tsukamoto |
| 6,316,289 B1 | 11/2001 | Chung |
| 6,322,901 B1 | 11/2001 | Bawendi et al. |
| 6,323,923 B1 | 11/2001 | Hoshino et al. |
| 6,323,982 B1 | 11/2001 | Hornbeck |
| 6,331,909 B1 | 12/2001 | Dunfield |
| 6,335,831 B2 | 1/2002 | Kowarz et al. |
| 6,339,417 B1 | 1/2002 | Quanrud |
| 6,342,970 B1 | 1/2002 | Sperger et al. |
| 6,355,831 B1 | 3/2002 | Wu et al. |
| 6,356,085 B1 | 3/2002 | Ryat et al. |
| 6,356,254 B1 | 3/2002 | Kimura |
| 6,356,378 B1 | 3/2002 | Huibers |
| 6,358,021 B1 | 3/2002 | Cabuz |
| 6,376,787 B1 | 4/2002 | Martin et al. |
| 6,377,233 B2 | 4/2002 | Colgan et al. |
| 6,377,321 B1 | 4/2002 | Khan et al. |
| 6,381,022 B1 | 4/2002 | Zavracky |
| 6,384,952 B1 | 5/2002 | Clark et al. |
| 6,384,953 B1 | 5/2002 | Russell et al. |
| 6,395,863 B2 | 5/2002 | Geaghan |
| 6,407,851 B1 | 6/2002 | Islam et al. |
| 6,417,868 B1 | 7/2002 | Bock et al. |
| 6,424,094 B1 | 7/2002 | Feldman |
| 6,429,601 B1 | 8/2002 | Friend et al. |
| 6,437,583 B1 | 8/2002 | Tartagni et al. |
| 6,438,282 B1 | 8/2002 | Takeda et al. |
| 6,446,486 B1 | 9/2002 | deBoer et al. |
| 6,447,126 B1 | 9/2002 | Hornbeck |
| 6,448,622 B1 | 9/2002 | Franke et al. |
| 6,449,084 B1 | 9/2002 | Guo |
| 6,452,712 B2 | 9/2002 | Atobe et al. |
| 6,456,420 B1 | 9/2002 | Goodwin-Johansson |
| 6,465,355 B1 | 10/2002 | Horsley |
| 6,466,190 B1 | 10/2002 | Evoy |
| 6,466,358 B2 | 10/2002 | Tew |
| 6,466,486 B2 | 10/2002 | Kawasumi |
| 6,473,072 B1 | 10/2002 | Comiskey et al. |
| 6,473,274 B1 | 10/2002 | Maimone et al. |
| 6,480,177 B2 | 11/2002 | Doherty et al. |
| 6,496,122 B2 | 12/2002 | Sampsell |
| 6,501,107 B1 | 12/2002 | Sinclair et al. |
| 6,504,589 B1 | 1/2003 | Kashima et al. |
| 6,507,330 B1 | 1/2003 | Handschy et al. |
| 6,507,331 B1 | 1/2003 | Schlangen et al. |
| 6,520,643 B1 | 2/2003 | Holman et al. |
| 6,522,794 B1 | 2/2003 | Bischel et al. |
| 6,545,335 B1 | 4/2003 | Chua et al. |
| 6,548,908 B2 | 4/2003 | Chua et al. |
| 6,549,195 B2 | 4/2003 | Hikida et al. |
| 6,549,338 B1 | 4/2003 | Wolverton et al. |
| 6,552,840 B2 | 4/2003 | Knipe |
| 6,556,338 B2 | 4/2003 | Han et al. |
| 6,589,625 B1 | 7/2003 | Kothari et al. |
| 6,593,834 B2 | 7/2003 | Qiu et al. |
| 6,593,934 B1 | 7/2003 | Liaw et al. |
| 6,597,419 B1 | 7/2003 | Okada et al. |
| 6,597,490 B2 | 7/2003 | Tayebati |
| 6,600,201 B2 | 7/2003 | Hartwell et al. |
| 6,603,520 B2 | 8/2003 | Umemoto et al. |
| 6,606,175 B1 | 8/2003 | Sampsell et al. |
| 6,618,187 B2 | 9/2003 | Pilossof |
| 6,620,712 B2 | 9/2003 | Huang et al. |
| 6,624,944 B1 | 9/2003 | Wallace et al. |
| 6,625,047 B2 | 9/2003 | Coleman, Jr. |
| 6,630,786 B2 | 10/2003 | Cummings et al. |
| 6,631,998 B2 | 10/2003 | Egawa et al. |
| 6,635,919 B1 | 10/2003 | Melendez et al. |
| 6,636,322 B1 | 10/2003 | Terashita |
| 6,642,913 B1 | 11/2003 | Kimura et al. |
| 6,643,069 B2 | 11/2003 | Dewald |
| 6,650,455 B2 | 11/2003 | Miles |
| 6,653,997 B2 | 11/2003 | Van Gorkom et al. |
| 6,657,832 B2 | 12/2003 | Williams et al. |
| 6,660,656 B2 | 12/2003 | Cheung et al. |
| 6,661,561 B2 | 12/2003 | Fitzpatrick et al. |
| 6,666,561 B1 | 12/2003 | Blakley |
| 6,674,033 B1 | 1/2004 | Wang |
| 6,674,090 B1 | 1/2004 | Chua et al. |
| 6,674,562 B1 | 1/2004 | Miles et al. |
| 6,674,563 B2 | 1/2004 | Chui et al. |
| 6,680,792 B2 | 1/2004 | Miles |
| 6,710,908 B2 | 3/2004 | Miles et al. |
| 6,741,377 B2 | 5/2004 | Miles |

(56) References Cited

U.S. PATENT DOCUMENTS

| | | |
|---|---|---|
| 6,741,383 B2 | 5/2004 | Huibers et al. |
| 6,741,384 B1 | 5/2004 | Martin et al. |
| 6,741,503 B1 | 5/2004 | Farris et al. |
| 6,742,907 B2 | 6/2004 | Funamoto et al. |
| 6,747,785 B2 | 6/2004 | Chen et al. |
| 6,747,800 B1 | 6/2004 | Lin |
| 6,750,876 B1 | 6/2004 | Atsatt et al. |
| 6,762,873 B1 | 7/2004 | Coker et al. |
| 6,768,555 B2 | 7/2004 | Chen et al. |
| 6,773,126 B1 | 8/2004 | Hatjasalo et al. |
| 6,775,174 B2 | 8/2004 | Huffman et al. |
| 6,778,155 B2 | 8/2004 | Doherty et al. |
| 6,778,746 B2 | 8/2004 | Charlton et al. |
| 6,781,643 B1 | 8/2004 | Watanabe et al. |
| 6,782,240 B1 | 8/2004 | Tabe |
| 6,787,384 B2 | 9/2004 | Okumura |
| 6,787,438 B1 | 9/2004 | Nelson |
| 6,788,520 B1 | 9/2004 | Behin et al. |
| 6,791,441 B2 | 9/2004 | Pillans et al. |
| 6,794,119 B2 | 9/2004 | Miles |
| 6,809,788 B2 | 10/2004 | Yamada et al. |
| 6,811,267 B1 | 11/2004 | Allen et al. |
| 6,813,060 B1 | 11/2004 | Garcia et al. |
| 6,819,469 B1 | 11/2004 | Koba |
| 6,822,628 B2 | 11/2004 | Dunphy et al. |
| 6,822,780 B1 | 11/2004 | Long, Jr. |
| 6,829,132 B2 | 12/2004 | Martin et al. |
| 6,841,787 B2 | 1/2005 | Almogy |
| 6,844,959 B2 | 1/2005 | Huibers et al. |
| 6,849,471 B2 | 2/2005 | Patel et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,864,882 B2 | 3/2005 | Newton |
| 6,867,896 B2 | 3/2005 | Miles |
| 6,870,581 B2 | 3/2005 | Li et al. |
| 6,870,654 B2 | 3/2005 | Lin et al. |
| 6,871,982 B2 | 3/2005 | Holman et al. |
| 6,879,354 B1 | 4/2005 | Sawayama et al. |
| 6,882,458 B2 | 4/2005 | Lin et al. |
| 6,891,658 B2 | 5/2005 | Whitehead et al. |
| 6,894,824 B2 | 5/2005 | Guo et al. |
| 6,897,855 B1 | 5/2005 | Matthies et al. |
| 6,903,860 B2 | 6/2005 | Ishii |
| 6,906,847 B2 | 6/2005 | Huibers et al. |
| 6,913,942 B2 | 7/2005 | Patel et al. |
| 6,917,459 B2 | 7/2005 | Nikkel et al. |
| 6,930,816 B2 | 8/2005 | Mochizuki |
| 6,940,631 B2 | 9/2005 | Ishikawa |
| 6,947,200 B2 | 9/2005 | Huibers |
| 6,958,847 B2 | 10/2005 | Lin |
| 6,959,990 B2 | 11/2005 | Penn |
| 6,960,305 B2 | 11/2005 | Doan et al. |
| 6,967,779 B2 | 11/2005 | Fadel et al. |
| 6,970,031 B1 | 11/2005 | Martin et al. |
| 6,980,350 B2 | 12/2005 | Hung et al. |
| 6,982,820 B2 | 1/2006 | Tsai |
| 6,995,890 B2 | 2/2006 | Lin |
| 6,999,225 B2 | 2/2006 | Lin et al. |
| 6,999,236 B2 | 2/2006 | Lin et al. |
| 7,006,272 B2 | 2/2006 | Tsai |
| 7,008,812 B1 | 3/2006 | Carley |
| 7,009,754 B2 | 3/2006 | Huibers |
| 7,012,732 B2 | 3/2006 | Miles |
| 7,016,095 B2 | 3/2006 | Lin |
| 7,038,752 B2 | 5/2006 | Lin |
| 7,049,164 B2 | 5/2006 | Bruner |
| 7,050,219 B2 | 5/2006 | Kimura |
| 7,053,737 B2 | 5/2006 | Schwartz et al. |
| 7,061,681 B2 | 6/2006 | Anderson et al. |
| 7,072,096 B2 | 7/2006 | Holman et al. |
| 7,075,700 B2 | 7/2006 | Muenter |
| 7,078,293 B2 | 7/2006 | Lin et al. |
| 7,088,566 B2 | 8/2006 | Martin et al. |
| 7,095,545 B2 | 8/2006 | Regan |
| 7,110,158 B2 | 9/2006 | Miles |
| 7,119,945 B2 | 10/2006 | Kothari et al. |
| 7,123,216 B1 | 10/2006 | Miles |
| 7,126,738 B2 | 10/2006 | Miles |
| 7,126,741 B2 | 10/2006 | Wagner et al. |
| 7,130,104 B2 | 10/2006 | Cummings |
| 7,138,984 B1 | 11/2006 | Miles |
| 7,139,112 B2 | 11/2006 | Whitehead, Jr. et al. |
| 7,142,346 B2 | 11/2006 | Chui et al. |
| 7,142,347 B2 | 11/2006 | Islam |
| 7,161,728 B2 | 1/2007 | Sampsell et al. |
| 7,161,730 B2 | 1/2007 | Floyd |
| 7,164,520 B2 | 1/2007 | Palmateer et al. |
| 7,172,915 B2 | 2/2007 | Lin et al. |
| 7,184,202 B2 | 2/2007 | Miles et al. |
| 7,187,489 B2 | 3/2007 | Miles |
| 7,196,837 B2 | 3/2007 | Sampsell et al. |
| 7,198,973 B2 | 4/2007 | Lin et al. |
| 7,218,429 B2 | 5/2007 | Batchko |
| 7,218,499 B2 | 5/2007 | Martin et al. |
| 7,221,495 B2 | 5/2007 | Miles et al. |
| 7,236,284 B2 | 6/2007 | Miles |
| 7,242,512 B2 | 7/2007 | Chui et al. |
| 7,245,285 B2 | 7/2007 | Yeh et al. |
| 7,250,315 B2 | 7/2007 | Miles |
| 7,250,930 B2 | 7/2007 | Hoffman et al. |
| 7,256,922 B2 | 8/2007 | Chui et al. |
| 7,289,259 B2 | 10/2007 | Chui et al. |
| 7,291,921 B2 | 11/2007 | Lin |
| 7,297,471 B1 | 11/2007 | Miles |
| 7,301,704 B2 | 11/2007 | Miles |
| 7,302,157 B2 | 11/2007 | Chui |
| 7,304,784 B2 | 12/2007 | Chui et al. |
| 7,310,121 B2 | 12/2007 | Hirakata et al. |
| 7,310,179 B2 | 12/2007 | Chui et al. |
| 7,321,456 B2 | 1/2008 | Cummings |
| 7,323,217 B2 | 1/2008 | Lin et al. |
| 7,327,510 B2 | 2/2008 | Cummings et al. |
| 7,342,705 B2 | 3/2008 | Chui et al. |
| 7,342,709 B2 | 3/2008 | Lin |
| 7,345,805 B2 | 3/2008 | Chui |
| 7,349,139 B2 | 3/2008 | Chui et al. |
| 7,349,141 B2 | 3/2008 | Tung et al. |
| 7,355,780 B2 | 4/2008 | Chui et al. |
| 7,355,782 B2 | 4/2008 | Miles |
| 7,369,292 B2 | 5/2008 | Xu et al. |
| 7,369,294 B2 | 5/2008 | Gally et al. |
| 7,369,296 B2 | 5/2008 | Floyd |
| 7,372,613 B2 | 5/2008 | Chui et al. |
| 7,372,619 B2 | 5/2008 | Miles |
| 7,375,465 B2 | 5/2008 | Chen |
| 7,379,227 B2 | 5/2008 | Miles |
| 7,382,515 B2 | 6/2008 | Chung et al. |
| 7,385,748 B2 | 6/2008 | Miles |
| 7,385,762 B2 | 6/2008 | Cummings |
| 7,388,697 B2 | 6/2008 | Chui et al. |
| 7,388,706 B2 | 6/2008 | Miles |
| 7,389,476 B2 | 6/2008 | Senda et al. |
| RE40,436 E | 7/2008 | Kothari et al. |
| 7,400,439 B2 | 7/2008 | Holman |
| 7,400,489 B2 | 7/2008 | Van Brocklin et al. |
| 7,403,180 B1 | 7/2008 | Silverstein et al. |
| 7,405,863 B2 | 7/2008 | Tung et al. |
| 7,417,735 B2 | 8/2008 | Cummings et al. |
| 7,417,784 B2 | 8/2008 | Sasagawa et al. |
| 7,420,725 B2 | 9/2008 | Kothari |
| 7,439,943 B2 | 10/2008 | Nakanishi |
| 7,450,295 B2 | 11/2008 | Tung et al. |
| 7,460,291 B2 | 12/2008 | Sampsell et al. |
| 7,460,292 B2 | 12/2008 | Chou |
| 7,463,421 B2 | 12/2008 | Miles |
| 7,471,444 B2 | 12/2008 | Miles |
| 7,476,327 B2 | 1/2009 | Tung et al. |
| 7,483,197 B2 | 1/2009 | Miles |
| 7,486,429 B2 | 2/2009 | Chui |
| 7,486,867 B2 | 2/2009 | Wang |

(56) References Cited

U.S. PATENT DOCUMENTS

| | | |
|---|---|---|
| 7,489,428 B2 | 2/2009 | Sampsell et al. |
| 7,492,503 B2 | 2/2009 | Chui |
| 7,508,571 B2 | 3/2009 | Gally et al. |
| 7,511,875 B2 | 3/2009 | Miles |
| 7,520,642 B2 | 4/2009 | Holman et al. |
| 7,527,995 B2 | 5/2009 | Sampsell |
| 7,527,996 B2 | 5/2009 | Luo et al. |
| 7,532,377 B2 | 5/2009 | Miles |
| 7,532,381 B2 | 5/2009 | Miles et al. |
| 7,532,386 B2 | 5/2009 | Cummings et al. |
| 7,534,640 B2 | 5/2009 | Sasagawa et al. |
| 7,535,466 B2 | 5/2009 | Sampsell et al. |
| 7,545,554 B2 | 6/2009 | Chui et al. |
| 7,547,565 B2 | 6/2009 | Lin |
| 7,550,794 B2 | 6/2009 | Miles et al. |
| 7,550,810 B2 | 6/2009 | Mignard et al. |
| 7,554,711 B2 | 6/2009 | Miles |
| 7,554,714 B2 | 6/2009 | Chui et al. |
| 7,556,917 B2 | 7/2009 | Miles |
| 7,561,321 B2 | 7/2009 | Heald |
| 7,561,323 B2 | 7/2009 | Gally et al. |
| 7,564,612 B2 | 7/2009 | Chui |
| 7,564,613 B2 | 7/2009 | Sasagawa et al. |
| 7,566,940 B2 | 7/2009 | Sasagawa et al. |
| 7,569,488 B2 | 8/2009 | Rafanan |
| 7,576,901 B2 | 8/2009 | Chui et al. |
| 7,583,350 B2 | 9/2009 | Chang et al. |
| 7,586,484 B2 | 9/2009 | Sampsell et al. |
| 7,595,926 B2 | 9/2009 | Sasagawa et al. |
| 7,601,571 B2 | 10/2009 | Chui et al. |
| 7,602,375 B2 | 10/2009 | Chui et al. |
| 7,603,001 B2 | 10/2009 | Wang et al. |
| 7,605,969 B2 | 10/2009 | Miles |
| 7,612,932 B2 | 11/2009 | Chui et al. |
| 7,619,810 B2 | 11/2009 | Miles |
| 7,623,287 B2 | 11/2009 | Sasagawa et al. |
| 7,626,581 B2 | 12/2009 | Chui et al. |
| 7,630,119 B2 | 12/2009 | Tung et al. |
| 7,630,123 B2 | 12/2009 | Kothari |
| 7,642,110 B2 | 1/2010 | Miles |
| 7,643,203 B2 | 1/2010 | Gousev et al. |
| 7,643,305 B2 | 1/2010 | Lin |
| 7,646,529 B2 | 1/2010 | Chui |
| 7,649,671 B2 | 1/2010 | Kothari et al. |
| 7,652,814 B2 | 1/2010 | Zhong et al. |
| 7,653,371 B2 | 1/2010 | Floyd |
| 7,656,391 B2 | 2/2010 | Kimura et al. |
| 7,660,031 B2 | 2/2010 | Floyd |
| 7,660,058 B2 | 2/2010 | Qiu et al. |
| 7,663,794 B2 | 2/2010 | Cummings |
| 7,672,035 B2 | 3/2010 | Sampsell et al. |
| 7,679,627 B2 | 3/2010 | Sampsell et al. |
| 7,679,812 B2 | 3/2010 | Sasagawa et al. |
| 7,692,844 B2 | 4/2010 | Miles |
| 7,704,772 B2 | 4/2010 | Tung et al. |
| 7,704,773 B2 | 4/2010 | Kogut et al. |
| 7,706,050 B2 | 4/2010 | Sampsell |
| 7,710,632 B2 | 5/2010 | Cummings |
| 7,710,636 B2 | 5/2010 | Chui |
| 7,711,239 B2 | 5/2010 | Sasagawa et al. |
| 7,719,500 B2 | 5/2010 | Chui |
| 7,719,747 B2 | 5/2010 | Tung et al. |
| 7,719,754 B2 | 5/2010 | Patel et al. |
| 7,723,015 B2 | 5/2010 | Miles |
| 7,733,439 B2 | 6/2010 | Sampsell et al. |
| 7,733,552 B2 | 6/2010 | Londergan et al. |
| 7,738,157 B2 | 6/2010 | Miles |
| 7,747,109 B2 | 6/2010 | Zhong et al. |
| 7,750,886 B2 | 7/2010 | Sampsell |
| 7,766,498 B2 | 8/2010 | Sampsell |
| 7,776,631 B2 | 8/2010 | Miles |
| 7,777,954 B2 | 8/2010 | Gruhlke et al. |
| 7,781,850 B2 | 8/2010 | Miles et al. |
| 7,782,522 B2 | 8/2010 | Lan |
| 7,782,525 B2 | 8/2010 | Sampsell et al. |
| 7,787,173 B2 | 8/2010 | Chui |
| 7,791,787 B2 | 9/2010 | Miles |
| 7,800,809 B2 | 9/2010 | Miles |
| 7,807,488 B2 | 10/2010 | Gally et al. |
| 7,808,694 B2 | 10/2010 | Miles |
| 7,826,120 B2 | 11/2010 | Miles |
| 7,830,586 B2 | 11/2010 | Miles |
| 7,830,587 B2 | 11/2010 | Miles |
| 7,830,588 B2 | 11/2010 | Miles |
| 7,830,589 B2 | 11/2010 | Floyd |
| 7,835,093 B2 | 11/2010 | Wang |
| 7,839,556 B2 | 11/2010 | Miles |
| 7,839,557 B2 | 11/2010 | Chui et al. |
| 7,839,559 B2 | 11/2010 | Miles |
| 7,846,344 B2 | 12/2010 | Miles |
| 7,848,001 B2 | 12/2010 | Miles |
| 7,848,004 B2 | 12/2010 | Miles |
| 7,852,544 B2 | 12/2010 | Sampsell |
| 7,852,545 B2 | 12/2010 | Miles |
| 7,855,824 B2 | 12/2010 | Gally |
| 7,864,402 B2 | 1/2011 | Chui et al. |
| 7,872,792 B2 | 1/2011 | Miles |
| 7,875,485 B2 | 1/2011 | Sasagawa et al. |
| RE42,119 E | 2/2011 | Chui et al. |
| 7,880,954 B2 | 2/2011 | Sampsell |
| 7,884,989 B2 | 2/2011 | Gally et al. |
| 7,889,415 B2 | 2/2011 | Kothari |
| 7,893,919 B2 | 2/2011 | Kothari et al. |
| 7,898,521 B2 | 3/2011 | Gally et al. |
| 7,898,722 B2 | 3/2011 | Miles |
| 7,898,723 B2 | 3/2011 | Khazeni et al. |
| 7,903,316 B2 | 3/2011 | Kothari et al. |
| 7,916,980 B2 | 3/2011 | Lasiter |
| 7,920,135 B2 | 4/2011 | Sampsell et al. |
| 7,924,494 B2 | 4/2011 | Tung et al. |
| 7,929,197 B2 | 4/2011 | Miles |
| 7,933,475 B2 | 4/2011 | Wang et al. |
| 7,936,031 B2 | 5/2011 | Sampsell et al. |
| 7,936,497 B2 | 5/2011 | Chui et al. |
| 7,944,599 B2 | 5/2011 | Chui et al. |
| 7,944,603 B2 | 5/2011 | Sasagawa et al. |
| 7,948,671 B2 | 5/2011 | Tung et al. |
| 7,982,700 B2 | 7/2011 | Chui et al. |
| 7,999,993 B2 | 8/2011 | Chui et al. |
| 8,004,504 B2 | 8/2011 | Cummings et al. |
| 8,008,736 B2 | 8/2011 | Kothari |
| 8,009,347 B2 | 8/2011 | Chui et al. |
| 8,014,059 B2 | 9/2011 | Miles |
| 8,023,167 B2 | 9/2011 | Sampsell |
| 8,035,883 B2 | 10/2011 | Kothari |
| 8,054,532 B2 | 11/2011 | Miles |
| 8,058,549 B2 | 11/2011 | Kothari et al. |
| 8,064,124 B2 | 11/2011 | Chung et al. |
| 8,068,710 B2 | 11/2011 | Bita et al. |
| 8,081,370 B2 | 12/2011 | Sampsell |
| 8,098,416 B2 | 1/2012 | Kothari et al. |
| 8,105,496 B2 | 1/2012 | Miles |
| 8,115,988 B2 | 2/2012 | Chui et al. |
| 8,120,125 B2 | 2/2012 | Sasagawa et al. |
| 8,124,434 B2 | 2/2012 | Gally et al. |
| 8,149,497 B2 | 4/2012 | Sasagawa et al. |
| 8,213,075 B2 | 7/2012 | Chui et al. |
| 8,218,229 B2 | 7/2012 | Sasagawa et al. |
| 8,229,253 B2 | 7/2012 | Zhong et al. |
| 8,264,763 B2 | 9/2012 | Miles |
| 8,278,726 B2 | 10/2012 | Miles et al. |
| 8,284,474 B2 | 10/2012 | Miles |
| 8,289,613 B2 | 10/2012 | Chui et al. |
| 8,298,847 B2 | 10/2012 | Kogut et al. |
| 8,344,470 B2 | 1/2013 | Sampsell et al. |
| 8,368,124 B2 | 2/2013 | Miles et al. |
| 8,416,487 B2 | 4/2013 | Miles |
| 8,422,108 B2 | 4/2013 | Miles |
| 2001/0003487 A1 | 6/2001 | Miles |
| 2001/0019479 A1 | 9/2001 | Nakabayashi et al. |
| 2001/0022636 A1 | 9/2001 | Yang et al. |
| 2001/0030861 A1 | 10/2001 | Oda et al. |
| 2001/0034075 A1 | 10/2001 | Onoya |
| 2001/0046081 A1 | 11/2001 | Hayashi et al. |

(56) References Cited

U.S. PATENT DOCUMENTS

| | | |
|---|---|---|
| 2001/0049061 A1 | 12/2001 | Nakagaki et al. |
| 2001/0050666 A1 | 12/2001 | Huang et al. |
| 2001/0051014 A1 | 12/2001 | Behin et al. |
| 2001/0055208 A1 | 12/2001 | Kimura |
| 2002/0005827 A1 | 1/2002 | Kobayashi |
| 2002/0014579 A1 | 2/2002 | Dunfield |
| 2002/0027636 A1 | 3/2002 | Yamada |
| 2002/0036304 A1 | 3/2002 | Ehmke et al. |
| 2002/0041264 A1 | 4/2002 | Quanrud |
| 2002/0050286 A1 | 5/2002 | Kubota |
| 2002/0050882 A1 | 5/2002 | Hyman et al. |
| 2002/0051281 A1 | 5/2002 | Ueda et al. |
| 2002/0054424 A1 | 5/2002 | Miles |
| 2002/0075226 A1 | 6/2002 | Lippincott |
| 2002/0075555 A1 | 6/2002 | Miles |
| 2002/0093722 A1 | 7/2002 | Chan et al. |
| 2002/0097133 A1 | 7/2002 | Charvet et al. |
| 2002/0114558 A1 | 8/2002 | Nemirovsky |
| 2002/0126364 A1 | 9/2002 | Miles |
| 2002/0139981 A1 | 10/2002 | Young |
| 2002/0149828 A1 | 10/2002 | Miles |
| 2002/0149850 A1 | 10/2002 | Heffner et al. |
| 2002/0154215 A1 | 10/2002 | Schechterman et al. |
| 2002/0167072 A1 | 11/2002 | Andosca |
| 2002/0167730 A1 | 11/2002 | Needham et al. |
| 2002/0171610 A1 | 11/2002 | Siwinski et al. |
| 2002/0175284 A1 | 11/2002 | Vilain |
| 2002/0181208 A1 | 12/2002 | Credelle et al. |
| 2002/0186108 A1 | 12/2002 | Hallbjorner |
| 2002/0186209 A1 | 12/2002 | Cok |
| 2002/0186483 A1 | 12/2002 | Hagelin et al. |
| 2003/0004272 A1 | 1/2003 | Power |
| 2003/0015936 A1 | 1/2003 | Yoon et al. |
| 2003/0029705 A1 | 2/2003 | Qiu et al. |
| 2003/0054925 A1 | 3/2003 | Burkhardt |
| 2003/0069413 A1 | 4/2003 | Pai et al. |
| 2003/0072020 A1 | 4/2003 | Mitsudomi et al. |
| 2003/0083429 A1 | 5/2003 | Smith et al. |
| 2003/0107692 A1 | 6/2003 | Sekiguchi |
| 2003/0107805 A1 | 6/2003 | Street |
| 2003/0112507 A1 | 6/2003 | Divelbiss et al. |
| 2003/0122773 A1 | 7/2003 | Washio et al. |
| 2003/0123245 A1 | 7/2003 | Parker et al. |
| 2003/0128197 A1 | 7/2003 | Turner et al. |
| 2003/0137215 A1 | 7/2003 | Cabuz |
| 2003/0137521 A1 | 7/2003 | Zehner et al. |
| 2003/0141453 A1 | 7/2003 | Reed et al. |
| 2003/0151821 A1 | 8/2003 | Favalora et al. |
| 2003/0156315 A1 | 8/2003 | Li et al. |
| 2003/0160919 A1 | 8/2003 | Suzuki et al. |
| 2003/0189528 A1 | 10/2003 | Antila et al. |
| 2003/0189536 A1 | 10/2003 | Ruigt |
| 2003/0202264 A1 | 10/2003 | Weber et al. |
| 2003/0210363 A1 | 11/2003 | Yasukawa et al. |
| 2003/0210851 A1 | 11/2003 | Fu et al. |
| 2003/0214621 A1 | 11/2003 | Kim et al. |
| 2004/0022044 A1 | 2/2004 | Yasuoka et al. |
| 2004/0046920 A1 | 3/2004 | Hayata et al. |
| 2004/0056742 A1 | 3/2004 | Dabbaj |
| 2004/0070711 A1 | 4/2004 | Wen et al. |
| 2004/0115339 A1 | 6/2004 | Ito |
| 2004/0124483 A1 | 7/2004 | Partridge et al. |
| 2004/0125048 A1 | 7/2004 | Fukuda et al. |
| 2004/0125282 A1 | 7/2004 | Lin et al. |
| 2004/0125347 A1 | 7/2004 | Patel et al. |
| 2004/0136045 A1 | 7/2004 | Tran |
| 2004/0140557 A1 | 7/2004 | Sun et al. |
| 2004/0145049 A1 | 7/2004 | McKinnell et al. |
| 2004/0147056 A1 | 7/2004 | McKinnell et al. |
| 2004/0148009 A1 | 7/2004 | Buzzard et al. |
| 2004/0150939 A1 | 8/2004 | Huff |
| 2004/0160143 A1 | 8/2004 | Shreeve et al. |
| 2004/0174583 A1 | 9/2004 | Chen et al. |
| 2004/0179281 A1 | 9/2004 | Reboa |
| 2004/0179445 A1 | 9/2004 | Park et al. |
| 2004/0184766 A1 | 9/2004 | Kim et al. |
| 2004/0201908 A1 | 10/2004 | Kaneko |
| 2004/0212026 A1 | 10/2004 | Van Brocklin et al. |
| 2004/0217378 A1 | 11/2004 | Martin et al. |
| 2004/0218334 A1 | 11/2004 | Martin et al. |
| 2004/0223204 A1 | 11/2004 | Mao et al. |
| 2004/0233503 A1 | 11/2004 | Kimura |
| 2005/0001797 A1 | 1/2005 | Miller et al. |
| 2005/0001828 A1 | 1/2005 | Martin et al. |
| 2005/0002082 A1 | 1/2005 | Miles |
| 2005/0012577 A1 | 1/2005 | Pillans et al. |
| 2005/0014374 A1 | 1/2005 | Partridge et al. |
| 2005/0017177 A1 | 1/2005 | Tai et al. |
| 2005/0017942 A1 | 1/2005 | Tsujino et al. |
| 2005/0038950 A1 | 2/2005 | Adelmann |
| 2005/0042117 A1 | 2/2005 | Lin |
| 2005/0054135 A1 | 3/2005 | Patel et al. |
| 2005/0057442 A1 | 3/2005 | Way |
| 2005/0068583 A1 | 3/2005 | Gutkowski et al. |
| 2005/0069209 A1 | 3/2005 | Damera-Venkata et al. |
| 2005/0116924 A1 | 6/2005 | Sauvante et al. |
| 2005/0122306 A1 | 6/2005 | Wilcox et al. |
| 2005/0168431 A1 | 8/2005 | Chui |
| 2005/0239275 A1 | 10/2005 | Muthukumar et al. |
| 2005/0259302 A9 | 11/2005 | Metz et al. |
| 2006/0002141 A1 | 1/2006 | Ouderkirk et al. |
| 2006/0017689 A1 | 1/2006 | Faase et al. |
| 2006/0022966 A1 | 2/2006 | Mar |
| 2006/0024017 A1 | 2/2006 | Page et al. |
| 2006/0044246 A1 | 3/2006 | Mignard |
| 2006/0044298 A1 | 3/2006 | Mignard et al. |
| 2006/0044654 A1 | 3/2006 | Vandorpe et al. |
| 2006/0044928 A1 | 3/2006 | Chui et al. |
| 2006/0056000 A1 | 3/2006 | Mignard |
| 2006/0057754 A1 | 3/2006 | Cummings |
| 2006/0066541 A1 | 3/2006 | Gally et al. |
| 2006/0066542 A1 | 3/2006 | Chui |
| 2006/0066557 A1 | 3/2006 | Floyd |
| 2006/0066560 A1 | 3/2006 | Gally et al. |
| 2006/0066561 A1 | 3/2006 | Chui et al. |
| 2006/0066586 A1 | 3/2006 | Gally et al. |
| 2006/0066594 A1 | 3/2006 | Tyger |
| 2006/0066596 A1 | 3/2006 | Sampsell et al. |
| 2006/0066597 A1 | 3/2006 | Sampsell |
| 2006/0066598 A1 | 3/2006 | Floyd |
| 2006/0066601 A1 | 3/2006 | Kothari et al. |
| 2006/0066937 A1 | 3/2006 | Chui |
| 2006/0067648 A1 | 3/2006 | Chui et al. |
| 2006/0067653 A1 | 3/2006 | Gally et al. |
| 2006/0077122 A1 | 4/2006 | Gally et al. |
| 2006/0077124 A1 | 4/2006 | Gally et al. |
| 2006/0077126 A1 | 4/2006 | Kothari |
| 2006/0077149 A1 | 4/2006 | Gally et al. |
| 2006/0077514 A1 | 4/2006 | Sampsell |
| 2006/0103912 A1 | 5/2006 | Katoh et al. |
| 2006/0132383 A1 | 6/2006 | Gally et al. |
| 2006/0176241 A1 | 8/2006 | Sampsell |
| 2006/0220160 A1 | 10/2006 | Miles |
| 2006/0265919 A1 | 11/2006 | Huang |
| 2006/0274400 A1 | 12/2006 | Miles |
| 2006/0274460 A1 | 12/2006 | Zuercher et al. |
| 2007/0077514 A1 | 4/2007 | Sawabe et al. |
| 2007/0086078 A1 | 4/2007 | Hagood et al. |
| 2007/0092728 A1 | 4/2007 | Ouderkirk et al. |
| 2007/0190886 A1 | 8/2007 | Satoh et al. |
| 2007/0247704 A1 | 10/2007 | Mignard |
| 2007/0249078 A1 | 10/2007 | Tung et al. |
| 2007/0253034 A1 | 11/2007 | Watanabe et al. |
| 2007/0253054 A1 | 11/2007 | Miles |
| 2008/0049450 A1 | 2/2008 | Sampsell |
| 2008/0055705 A1 | 3/2008 | Kothari |
| 2008/0084600 A1 | 4/2008 | Bita et al. |
| 2008/0084602 A1 | 4/2008 | Xu et al. |
| 2008/0088910 A1 | 4/2008 | Miles |
| 2008/0100900 A1 | 5/2008 | Chui |
| 2008/0112039 A1 | 5/2008 | Chui et al. |
| 2008/0151347 A1 | 6/2008 | Chui et al. |
| 2008/0157413 A1 | 7/2008 | Lin |
| 2008/0158648 A1 | 7/2008 | Cummings |

(56) References Cited

U.S. PATENT DOCUMENTS

| | | |
|---|---|---|
| 2008/0191978 A1 | 8/2008 | Miles |
| 2008/0192029 A1 | 8/2008 | Anderson et al. |
| 2009/0059346 A1 | 3/2009 | Xu |
| 2009/0086301 A1 | 4/2009 | Gally et al. |
| 2009/0097100 A1 | 4/2009 | Gally et al. |
| 2009/0103161 A1 | 4/2009 | Kothari et al. |
| 2009/0103165 A1 | 4/2009 | Kothari et al. |
| 2009/0126792 A1 | 5/2009 | Gruhlke et al. |
| 2009/0147535 A1 | 6/2009 | Mienko et al. |
| 2009/0151771 A1 | 6/2009 | Kothari et al. |
| 2009/0168459 A1 | 7/2009 | Holman et al. |
| 2009/0174651 A1 | 7/2009 | Jacobson et al. |
| 2009/0225394 A1 | 9/2009 | Chui et al. |
| 2009/0242024 A1 | 10/2009 | Kothari et al. |
| 2009/0267953 A1 | 10/2009 | Sampsell et al. |
| 2010/0134503 A1 | 6/2010 | Sampsell et al. |
| 2010/0165443 A1 | 7/2010 | Chui |
| 2010/0220248 A1 | 9/2010 | Miles |
| 2010/0245370 A1 | 9/2010 | Narayanan et al. |
| 2010/0245975 A1 | 9/2010 | Cummings |
| 2010/0284055 A1 | 11/2010 | Kothari et al. |
| 2010/0290102 A1 | 11/2010 | Lan |
| 2011/0019380 A1 | 1/2011 | Miles |
| 2011/0026095 A1 | 2/2011 | Kothari et al. |
| 2011/0026096 A1 | 2/2011 | Miles |
| 2011/0038027 A1 | 2/2011 | Miles |
| 2011/0043891 A1 | 2/2011 | Miles |
| 2011/0058243 A1 | 3/2011 | Wang |
| 2011/0080632 A1 | 4/2011 | Miles |
| 2011/0122479 A1 | 5/2011 | Sampsell |
| 2011/0148828 A1 | 6/2011 | Sampsell et al. |
| 2011/0157010 A1 | 6/2011 | Kothari et al. |
| 2011/0170167 A1 | 7/2011 | Miles |
| 2011/0177745 A1 | 7/2011 | Lasiter |
| 2011/0188110 A1 | 8/2011 | Miles |
| 2011/0199667 A1 | 8/2011 | Wang et al. |
| 2011/0260956 A1 | 10/2011 | Govil et al. |
| 2012/0044563 A1 | 2/2012 | Cummings et al. |
| 2012/0062310 A1 | 3/2012 | Miles |
| 2012/0085731 A1 | 4/2012 | Miles |
| 2012/0088027 A1 | 4/2012 | Kothari et al. |
| 2012/0099174 A1 | 4/2012 | Miles |
| 2012/0105385 A1 | 5/2012 | Sasagawa et al. |
| 2012/0127556 A1 | 5/2012 | Gally et al. |
| 2012/0134008 A1 | 5/2012 | Bita et al. |
| 2012/0139976 A1 | 6/2012 | Chui et al. |
| 2012/0162232 A1 | 6/2012 | He et al. |
| 2012/0182595 A1 | 7/2012 | Miles |
| 2012/0188215 A1 | 7/2012 | Bushankuchu |
| 2012/0194897 A1 | 8/2012 | Zhong et al. |
| 2012/0287138 A1 | 11/2012 | Zhong et al. |
| 2013/0069958 A1 | 3/2013 | Chui et al. |
| 2013/0249964 A1 | 9/2013 | Sampsell et al. |

FOREIGN PATENT DOCUMENTS

| | | |
|---|---|---|
| CN | 1213861 A | 4/1999 |
| DE | 3402746 | 8/1985 |
| DE | 4108966 A1 | 9/1992 |
| DE | 19622748 | 12/1997 |
| DE | 10228946 A1 | 1/2004 |
| EP | 0 035 299 | 9/1983 |
| EP | 0112646 A2 | 7/1984 |
| EP | 0223136 A2 | 5/1987 |
| EP | 0261897 A2 | 3/1988 |
| EP | 0278038 A1 | 8/1988 |
| EP | 0295802 A1 | 12/1988 |
| EP | 0300754 A2 | 1/1989 |
| EP | 0306308 A2 | 3/1989 |
| EP | 0310176 A2 | 4/1989 |
| EP | 0318050 A2 | 5/1989 |
| EP | 0361981 A2 | 4/1990 |
| EP | 0417523 A2 | 3/1991 |
| EP | 0467048 A2 | 1/1992 |
| EP | 0539099 A2 | 4/1993 |
| EP | 0570906 A1 | 11/1993 |
| EP | 0582850 A1 | 2/1994 |
| EP | 583102 A1 | 2/1994 |
| EP | 0590511 A1 | 4/1994 |
| EP | 0608056 A1 | 7/1994 |
| EP | 0621500 A1 | 10/1994 |
| EP | 0622856 A1 | 11/1994 |
| EP | 0655725 A1 | 5/1995 |
| EP | 0 667 548 | 8/1995 |
| EP | 0 668 490 | 8/1995 |
| EP | 0 695 959 | 2/1996 |
| EP | 0725380 A1 | 8/1996 |
| EP | 0786911 A2 | 7/1997 |
| EP | 0788005 A2 | 8/1997 |
| EP | 0822441 A2 | 2/1998 |
| EP | 0830032 A2 | 3/1998 |
| EP | 0843364 A1 | 5/1998 |
| EP | 0852371 A1 | 7/1998 |
| EP | 0855745 A1 | 7/1998 |
| EP | 0867747 A2 | 9/1998 |
| EP | 0 879 991 | 11/1998 |
| EP | 0907050 A1 | 4/1999 |
| EP | 0911794 A1 | 4/1999 |
| EP | 0957392 A1 | 11/1999 |
| EP | 0 969 306 | 1/2000 |
| EP | 0984314 A2 | 3/2000 |
| EP | 1003062 A1 | 5/2000 |
| EP | 1014161 A1 | 6/2000 |
| EP | 1017038 A2 | 7/2000 |
| EP | 1067805 A2 | 1/2001 |
| EP | 1089115 A1 | 4/2001 |
| EP | 1146533 A1 | 10/2001 |
| EP | 1 227 346 | 7/2002 |
| EP | 1251454 A2 | 10/2002 |
| EP | 1336876 A1 | 8/2003 |
| EP | 1341025 A1 | 9/2003 |
| EP | 1343190 A2 | 9/2003 |
| EP | 1345197 A1 | 9/2003 |
| EP | 1381023 A2 | 1/2004 |
| EP | 1389775 A2 | 2/2004 |
| EP | 1413543 A1 | 4/2004 |
| EP | 1435336 A2 | 7/2004 |
| EP | 1473691 A2 | 11/2004 |
| EP | 1484635 A1 | 12/2004 |
| FR | 2824643 A1 | 11/2002 |
| GB | 2260203 A | 4/1993 |
| GB | 2278222 | 11/1994 |
| GB | 2315356 A | 1/1998 |
| GB | 2321532 A | 7/1998 |
| GB | 2331615 | 5/1999 |
| GB | 2401200 | 11/2004 |
| JP | 56010976 | 2/1981 |
| JP | 56010977 A | 2/1981 |
| JP | 56-088111 | 7/1981 |
| JP | 59104185 A | 6/1984 |
| JP | 60147718 | 8/1985 |
| JP | 60242408 A | 12/1985 |
| JP | 61093678 A | 5/1986 |
| JP | 62009317 | 1/1987 |
| JP | 62082454 | 4/1987 |
| JP | 1102415 | 4/1989 |
| JP | 2003993 A | 1/1990 |
| JP | 2068513 A | 3/1990 |
| JP | 2132424 A | 5/1990 |
| JP | 02151079 | 6/1990 |
| JP | 2237172 A | 9/1990 |
| JP | 3030419 A | 2/1991 |
| JP | 3109524 | 5/1991 |
| JP | 03180890 | 8/1991 |
| JP | 3199920 A | 8/1991 |
| JP | 04081816 | 3/1992 |
| JP | 4127580 A | 4/1992 |
| JP | 04190323 | 7/1992 |
| JP | 04238321 | 8/1992 |
| JP | 04276721 | 10/1992 |
| JP | 04309925 | 11/1992 |
| JP | 5-49238 | 2/1993 |
| JP | 5-281479 | 10/1993 |

(56) References Cited

FOREIGN PATENT DOCUMENTS

| | | |
|---|---|---|
| JP | 5259495 A | 10/1993 |
| JP | 5275401 A | 10/1993 |
| JP | 6021494 A | 1/1994 |
| JP | 6209114 A | 7/1994 |
| JP | 06281956 | 10/1994 |
| JP | 06350105 | 12/1994 |
| JP | 07045550 | 2/1995 |
| JP | 07060844 | 3/1995 |
| JP | 07098326 | 4/1995 |
| JP | 07509327 | 10/1995 |
| JP | 8018990 A | 1/1996 |
| JP | 08-051230 | 2/1996 |
| JP | 08094992 | 4/1996 |
| JP | 09022012 | 1/1997 |
| JP | 09036387 | 2/1997 |
| JP | 09068722 | 3/1997 |
| JP | 9127439 | 5/1997 |
| JP | 09160032 | 6/1997 |
| JP | 9171111 A | 6/1997 |
| JP | 09-189910 | 7/1997 |
| JP | 09189869 A | 7/1997 |
| JP | 09507920 | 8/1997 |
| JP | 09260696 | 10/1997 |
| JP | 9275220 A | 10/1997 |
| JP | 09281917 | 10/1997 |
| JP | 09311333 | 12/1997 |
| JP | 10020328 | 1/1998 |
| JP | 10161630 | 6/1998 |
| JP | 10202948 | 8/1998 |
| JP | 10325953 A | 12/1998 |
| JP | 11174234 | 7/1999 |
| JP | 11-211999 | 8/1999 |
| JP | 11231321 A | 8/1999 |
| JP | 11232919 | 8/1999 |
| JP | 11249132 A | 9/1999 |
| JP | 11295725 | 10/1999 |
| JP | 2000081848 | 3/2000 |
| JP | 2000514568 | 10/2000 |
| JP | 2000306515 A | 11/2000 |
| JP | 2001021883 | 1/2001 |
| JP | 2001343514 | 12/2001 |
| JP | 2002062505 A | 2/2002 |
| JP | 2002174780 | 6/2002 |
| JP | 2002175053 | 6/2002 |
| JP | 2002277771 A | 9/2002 |
| JP | 2002287047 A | 10/2002 |
| JP | 2003195201 A | 7/2003 |
| JP | 2003315732 A | 11/2003 |
| JP | 2004004553 | 1/2004 |
| JP | 2004029571 A | 1/2004 |
| JP | 2004157527 A | 6/2004 |
| JP | 2004212673 A | 7/2004 |
| JP | 2004235465 | 8/2004 |
| JP | 2004286825 A | 10/2004 |
| KR | 20020010322 | 2/2002 |
| RO | 157313 | 5/1991 |
| TW | 200522132 | 7/2005 |
| WO | WO-9105284 | 4/1991 |
| WO | WO-9210925 | 6/1992 |
| WO | WO-9406871 A1 | 3/1994 |
| WO | WO-9422045 | 9/1994 |
| WO | WO-9428452 A1 | 12/1994 |
| WO | WO-9429840 | 12/1994 |
| WO | WO-9501584 A1 | 1/1995 |
| WO | WO-9514256 A1 | 5/1995 |
| WO | WO-9515582 A1 | 6/1995 |
| WO | WO-9530924 A1 | 11/1995 |
| WO | WO-9608833 A1 | 3/1996 |
| WO | WO-9610889 A1 | 4/1996 |
| WO | WO-9616348 A1 | 5/1996 |
| WO | WO-9638319 A2 | 12/1996 |
| WO | WO-9701240 A1 | 1/1997 |
| WO | WO-9716756 A1 | 5/1997 |
| WO | WO-9717628 A1 | 5/1997 |
| WO | WO-9744707 A2 | 11/1997 |
| WO | WO-9746908 A1 | 12/1997 |
| WO | WO 98/14804 | 4/1998 |
| WO | WO-9819201 A1 | 5/1998 |
| WO | WO-9832047 A1 | 7/1998 |
| WO | WO-9835182 A1 | 8/1998 |
| WO | WO 98/43129 | 10/1998 |
| WO | WO-9859382 A1 | 12/1998 |
| WO | WO-9904296 A1 | 1/1999 |
| WO | WO-0173937 A2 | 10/2001 |
| WO | WO-02063602 A1 | 8/2002 |
| WO | WO-02071132 A2 | 9/2002 |
| WO | WO-02079853 A1 | 10/2002 |
| WO | WO-03007049 | 1/2003 |
| WO | WO-03014789 A2 | 2/2003 |
| WO | WO-03015071 A2 | 2/2003 |
| WO | WO-03044765 A2 | 5/2003 |
| WO | WO-03054925 A2 | 7/2003 |
| WO | WO-03056876 A2 | 7/2003 |
| WO | WO-03060940 A1 | 7/2003 |
| WO | WO-03069404 A1 | 8/2003 |
| WO | WO-03069413 A1 | 8/2003 |
| WO | WO-03073151 A1 | 9/2003 |
| WO | WO-03079323 A1 | 9/2003 |
| WO | WO-03085728 A1 | 10/2003 |
| WO | WO-03090199 A1 | 10/2003 |
| WO | WO-2004006003 A1 | 1/2004 |
| WO | WO-2004026757 A2 | 4/2004 |
| WO | WO-2004049034 A1 | 6/2004 |
| WO | WO-2004054088 A2 | 6/2004 |
| WO | WO-2004075526 A2 | 9/2004 |
| WO | WO-2004088372 A1 | 10/2004 |
| WO | WO-2005006364 A1 | 1/2005 |
| WO | WO-2005011012 A1 | 2/2005 |
| WO | WO-2005066596 A1 | 7/2005 |
| WO | WO-2005076051 A1 | 8/2005 |
| WO | WO-2005093488 | 10/2005 |
| WO | WO-2005093490 | 10/2005 |
| WO | WO-2005122123 A1 | 12/2005 |
| WO | WO-2006008702 A2 | 1/2006 |
| WO | WO-2006014929 | 2/2006 |
| WO | WO-2006036440 | 4/2006 |
| WO | WO-2006036451 A1 | 4/2006 |
| WO | WO-2006036495 | 4/2006 |
| WO | WO-2006036519 | 4/2006 |
| WO | WO-2006036540 A1 | 4/2006 |
| WO | WO-2006036564 | 4/2006 |
| WO | WO-2006036588 | 4/2006 |
| WO | WO-2007127046 | 11/2007 |
| WO | WO-2007149474 | 12/2007 |
| WO | WO-2008027275 | 3/2008 |
| WO | WO-2008039229 | 4/2008 |
| WO | WO-2008045200 | 4/2008 |
| WO | WO-2008045207 | 4/2008 |
| WO | WO-2008045218 A1 | 4/2008 |
| WO | WO-2008045222 A1 | 4/2008 |
| WO | WO-2008045224 | 4/2008 |
| WO | WO-2008045310 | 4/2008 |
| WO | WO-2008045311 A2 | 4/2008 |
| WO | WO-2008045312 A1 | 4/2008 |
| WO | WO-2008045362 A2 | 4/2008 |
| WO | WO-2008045363 | 4/2008 |
| WO | WO-2008045364 A2 | 4/2008 |
| WO | WO-2008045462 | 4/2008 |
| WO | WO-2008045463 | 4/2008 |
| WO | WO-2008069877 | 6/2008 |
| WO | WO-2008109620 A1 | 9/2008 |
| WO | WO-2008137299 | 11/2008 |
| WO | WO-2009006122 | 1/2009 |
| WO | WO-2009032525 A2 | 3/2009 |
| WO | WO-2009042497 A2 | 4/2009 |
| WO | WO-2009055223 A2 | 4/2009 |
| WO | WO-2009073555 | 6/2009 |
| WO | WO-2009076075 | 6/2009 |

OTHER PUBLICATIONS

Aratani K., et al., Surface micromachined tuneable interferometer array, Sensors and Actuators, pp. 17-23. (1994).

(56) References Cited

OTHER PUBLICATIONS

Conner, Hybrid Color Display Using Optical Interference Filter Array, SID Digest, pp. 577-580 (1993).
Goossen et al., Silicon Modulator Based on Mechanically-Active Anti-Reflection Layer with 1 Mbit/sec Capability for Fiber-in-the-Loop Applications, IEEE Photonics Technology Letters, pp. 1119-1121 (Sep. 1994).
Jerman et al., A Miniature Fabry-Perot Interferometer with a Corrugated Silicon Diaphragm Support, (1988).
Jerman et al., Miniature Fabry-Perot Interferometers Micromachined in Silicon for Use in Optical Fiber WDM Systems, Transducers, San Francisco, Jun. 24-27, 1991, Proceedings on the Int'l. Conf. on Solid State Sensors and Actuators, Jun. 24, 1991, pp. 372-375.
Longhurst, 1963, Chapter IX: Multiple Beam Interferometry, in Geometrical and Physical Optics, pp. 153-157.
Miles, A New Reflective FPD Technology Using Interferometric Modulation, Journal of the SID, May 4, 1997.
Pape et al., Characteristics of the deformable mirror device for optical information processing, Optical Engineering, 22(6):676-681, Nov.-Dec. 1983.
Tolansky, 1948, Chapter II: Multiple-Beam Interference, in Multiple-bean Interferometry of Surfaces and Films, Oxford at the Clarendon Press, pp. 8-11.
Williams, et al. Etch Rates for Micromachining Processing. Journal of Microelectromechanical Systems, 5(4):256-259, (Dec. 1996).
Winters, et al. The etching of silicon with XeF2 vapor. Applied Physics Letters, 34(1):70-73, (Jan. 1979).
Office Action mailed Jun. 25, 1999 in U.S. Appl. No. 09/056,975.
Office Action mailed Oct. 24, 2000 in U.S. Appl. No. 09/056,975.
Office Action mailed Jun. 24, 2002 in U.S. Appl. No. 09/056,975.
Office Action mailed Jun. 6, 2003 in U.S. Appl. No. 10/076,224.
Office Action mailed Jun. 19, 2002 in U.S. Appl. No. 09/966,843.
Office Action mailed Aug. 1, 2007 in U.S. Appl. No. 11/056,571.
Office Action mailed Aug. 9, 2006 in U.S. Appl. No. 11/056,571.
Office Action mailed Feb. 8, 2007 in U.S. Appl. No. 11/056,571.
Office Action mailed Jun. 28, 2006 in U.S. Appl. No. 10/752,140.
Office Action mailed Jan. 30, 2007 in U.S. Appl. No. 10/752,140.
Office Action mailed Jun. 21, 2007 in U.S. Appl. No. 10/752,140.
Office Action dated Dec. 14, 2007 in U.S. Appl. No. 10/752,140.
Office Action dated May 15, 2009 in U.S. Appl. No. 10/752,140.
Office Action mailed Jan. 17, 2007 in U.S. Appl. No. 11/492,535.
Office Action mailed Jun. 25, 2007 in U.S. Appl. No. 11/492,535.
Office Action dated Jan. 2, 2008 in U.S. Appl. No. 11/492,535.
Office Action dated Aug. 20, 2009 in U.S. Appl. No. 12/031,603.
Office Action dated Jan. 27, 2010 in U.S. Appl. No. 12/031,603.
Office Action dated Jul. 23, 2010 in U.S. Appl. No. 12/031,603.
Office Action dated Jul. 23, 2008 in U.S. Appl. No. 11/267,819.
Office Action dated Jan. 26, 2009 in U.S. Appl. No. 11/267,819.
Office Action dated May 28, 2009 in U.S. Appl. No. 11/267,819.
Office Action dated Nov. 17, 2009 in U.S. Appl. No. 11/267,819.
Office Action mailed Jun. 27, 2006 in U.S. Appl. No. 11/192,436.
Office Action mailed Feb. 27, 2007 in U.S. Appl. No. 11/192,436.
Office Action dated Nov. 19, 2007 in U.S. Appl. No. 11/192,436.
Office Action dated Dec. 13, 2007 in U.S. Appl. No. 11/742,271.
Office Action dated Jul. 28, 2008 in U.S. Appl. No. 11/742,271.
Office Action dated Oct. 21, 2008 in U.S. Appl. No. 11/742,271.
Office Action mailed Sep. 21, 2006 in U.S. Appl. No. 11/150,683.
Office Action mailed Mar. 15, 2007 in U.S. Appl. No. 11/150,683.
Office Action mailed Sep. 21, 2007 in U.S. Appl. No. 11/150,683.
Office Action mailed Mar. 26, 2008 in U.S. Appl. No. 11/150,683.
Office Action mailed Apr. 13, 2007 in U.S. Appl. No. 11/432,724.
Office Action mailed Sep. 11, 2007 in U.S. Appl. No. 11/432,724.
Office Action mailed Dec. 21, 2007 in U.S. Appl. No. 11/432,724.
Office Action mailed Jul. 28, 2008 in U.S. Appl. No. 11/432,724.
Office Action mailed Mar. 3, 2009 in U.S. Appl. No. 11/432,724.
Office Action mailed Sep. 14, 2009 in U.S. Appl. No. 11/432,724.
Office Action dated Sep. 24, 2009 in U.S. Appl. No. 11/626,792.
Office Action dated Apr. 1, 2010 in U.S. Appl. No. 11/626,792.
Office Action dated Feb. 1, 2008 in U.S. Appl. No. 11/754,229.
Office Action dated Aug. 5, 2008 in U.S. Appl. No. 11/754,229.
Office Action dated Apr. 1, 2010 in U.S. Appl. No. 12/368,136.
Office Action dated Mar. 17, 2008 in U.S. Appl. No. 11/433,294.
Office Action dated Aug. 6, 2008 in U.S. Appl. No. 11/399,681.
Office Action dated Jan. 21, 2010 in U.S. Appl. No. 11/668,973.
Office Action mailed Jan. 30, 2007 in U.S. Appl. No. 11/517,721.
Office Action mailed May 4, 2007 in U.S. Appl. No. 11/591,928.
Office Action mailed Oct. 22, 2007 in U.S. Appl. No. 11/591,928.
Office Action mailed Jan. 17, 2008 in U.S. Appl. No. 11/591,928.
Office Action dated Jul. 21, 2008 in U.S. Appl. No. 11/591,928.
Office Action dated Jul. 23, 2009 in U.S. Appl. No. 12/363,671.
Office Action dated Dec. 31, 2009 in U.S. Appl. No. 12/363,671.
Office Action dated Dec. 10, 2009 in U.S. Appl. No. 11/841,741.
Office Action dated Jan. 27, 2010 in U.S. Appl. No. 11/841,726.
Office Action dated Sep. 29, 2009 in U.S. Appl. No. 11/841,752.
Office Action dated Jul. 30, 2009 in U.S. Appl. No. 11/841,780.
Office Action dated Feb. 22, 2010 in U.S. Appl. No. 11/841,780.
Office Action dated Sep. 18, 2008 in U.S. Appl. No. 11/841,795.
Office Action dated Jul. 23, 2009 in U.S. Appl. No. 1/841,795.
Office Action dated Apr. 2, 2010 in U.S. Appl. No. 1/841,795.
Office Action dated Jul. 28, 2009 in U.S. Appl. No. 11/841,810.
Office Action dated Sep. 4, 2009 in U.S. Appl. No. 11/841,820.
Office Action dated Apr. 21, 2010 in U.S. Appl. No. 11/841,820.
Office Action dated Aug. 14, 2009 in U.S. Appl. No. 11/841,833.
Office Action dated Apr. 28, 2006 in Korean Pat. App. No. 10-2000-7011227.
Official Letter received Mar. 21, 2000 in R.O.C. App. No. 088105551.
Office Action received May 25, 2001 in R.O.C. App. No. 089113021.
ISR for PCT/US99/07271 filed Apr. 1, 1999.
WO for PCT/US99/07271 filed Apr. 1, 1999.
IPER for PCT/US99/07271 filed Apr. 1, 1999.
Mehregany et al., 1996, MEMS applications in optical systems, IEEE/LEOS 1996 Summer Topical Meetings, pp. 75-76.
Miles et al, Oct. 21, 1997, A MEMS based interferometric modulator (IMOD) for display applications, Proceedings of Sensors Expo, pp. 281-284.
Office Action dated Jan. 24, 2011 in U.S. Appl. No. 12/031,603.
Office Action dated Aug. 24, 2010 in U.S. Appl. No. 11/742,271.
Office Action dated Feb. 11, 2011 in U.S. Appl. No. 11/742,271.
Office Action dated Dec. 27, 2010 in U.S. Appl. No. 11/267,939.
Office Action dated Nov. 30, 2010 in U.S. Appl. No. 11/626,792.
Office Action dated May 2, 2011 in U.S. Appl. No. 11/626,792.
Office Action dated Jan. 26, 2011 in U.S. Appl. No. 12/908,846.
Office Action dated May 14, 2009 in U.S. Appl. No. 11/698,721.
Office Action dated Nov. 12, 2009 in U.S. Appl. No. 11/698,721.
Office Action dated Oct. 8, 2010 in U.S. Appl. No. 1/841,795.
Cacharelis et al., 1997, A Reflective-mode PDLC Light Valve Display Technology, Proceedings of European Solid State Device Research Conference (ESSDERC), pp. 596-599.
Maier et al., 1996, 1.3" active matrix liquid crystal spatial light modulator with 508 dpi resolution, SPIE vol. 2754, pp. 171-179.
Office Action dated Oct. 27, 2011 in U.S. Appl. No. 11/626,792.
Office Action dated Sep. 23, 2011 in U.S. Appl. No. 12/642,750.
Office Action dated Oct. 9, 2012 in U.S. Appl. No. 12/642,750.
Office Action dated Sep. 25, 2012 in U.S. Appl. No. 13/005,934.
Office Action dated Jul. 5,2012 in U.S. Appl. No. 13/225,357.
Office Action dated Mar. 30, 2012 in U.S. Appl. No. 11/626,792.
Office Action dated Mar. 27, 2012 in U.S. Appl. No. 12/642,750.
Office Action dated May 21, 2012 in U.S. Appl. No. 12/939,087.
Office Action dated Nov. 21, 2012 in U.S. Appl. No. 13/225,357.
Office Action dated Dec. 21, 2012 in U.S. Appl. No. 13/016,564.
Office Action dated Jan. 17, 2013 in U.S. Appl. No. 12/939,087.
Office Action dated Dec. 11, 2012 in U.S. Appl. No. 12/897,662.
Office Action dated Dec. 21, 2012 in U.S. Appl. No. 13/333,257.
Abilieah A, "Optical Tiled AMLCD for Very Large Display Applications," SID International Symposium Digest of Papers, Boston, 1992, 945-949.
Akasaka Y., "Three-Dimensional IC Trends," Proceedings of IEEE, 1986, vol. 74 (12), pp. 1703-1714.
Amm, et al., "5.2 Grating Light Valve Technology Update and Novel Applications," presented at Society for Information Display Symposium, May 19, 1998.
Application as filed in U.S. App. No. 13/018,221, dated Jan. 31, 2011.

(56) References Cited

OTHER PUBLICATIONS

Application as Filed in U.S. App. No. 13/232,226, dated Sep. 14, 2011.
Austrian Search Report for Ex144/2005 dated Aug. 11, 2005.
Austrian Search Report for U.S. Appl. No. 11/036,965 dated Jul. 25, 2005 (Publication No. 2005/0179977).
Austrian Search Report for U.S. Appl. No. 11/040,824 dated Jul. 14, 2005 (Publication No. 2006/077522).
Austrian Search Report for U.S. Appl. No. 11/057,392 dated May 12, 2005 (Publication No. 2006/077510).
Austrian Search Report for U.S. App. No. 11/064,143 dated Aug. 12, 2005.
Austrian Search Report for U.S. App. No. 11/140,561 dated Jul. 12, 2005.
Austrian Search Report for U.S. App. No. 11/051,258 dated May 13, 2005.
Austrian Search Report for U.S. App. No. 11/077,974 dated Jul. 14, 2005.
Austrian Search Report in U.S. App. No. 11/036,966 dated Jul. 28, 2005.
Austrian Search Report in U.S. App. No. 11/041,020 dated May 9, 2005.
Austrian Search Report in U.S. App. No. 11/083,841 mailed Jul. 14, 2005.
Austrian Search Report No. 140/2005, dated Jul. 15, 2005.
Austrian Search Report No. 150/2005, dated Jul. 29, 2005.
Austrian Search Report No. 161/2005, dated Jul. 15, 2005.
Austrian Search Report No. 162/2005, dated Jul. 14, 2005.
Austrian Search Report No. 164/2005, dated Jul. 4, 2005.
Austrian Search Report No. 66/2005 Dated May 9 2005.
Bains, "Digital Paper Display Technology Holds Promise for Portables," CommsDesign EE Times, 2000.
Bass, M., et al., Handbook of Optics vol. I: Fundamentals, Techniques, and Design. Second Edition, McGraw-Hill, Inc., New York, 1995, pp. 2.29-2.36.
Bouchaud J, et al., " RF MEMS Analysis forecasts and Technology Review Chip Unaxis," Sep. 2003, p. 26-29 [online] Retrieved From the Internet: <Url:Http://Semiconductors.Unaxis.Com/En/Download/Rf%20Mems.Pdf&Gt. Cited by Other.
Butler, et al., "An Embedded Overlay Concept for Microsystems Packaging," IEEE Transactions on Advanced Packaging IEEE, 2000, vol. 23(4), 617-622.
Chan, et al., "Low-Actuation Voltage RF Mems Shunt Switch With Cold Switching Lifetime of Seven Billion Cycles," Journal of Microelectromechanical Systems, vol. 12(5), 713-719.
Chiou, et al., "A Novel Capacitance Control Design of Tunable Capacitor using Multiple Electrostatic Driving Electrodes," IEEE Nanoelectronics and Giga-Scale Systems, 2001, 319-324.
De Coster, et al., "Variable RF Mems Capacitors With Extended Tuning Range," IEEE International Solid-State Sensors and Actuators Conference, 2003, vol. 2, 1784-1787.
Fan, et al., "Channel Drop Filters in Photonic Crystals," Optics Express, 1998, vol. 3(1), pp. 4-11.
Fork, et al., "P-67 Chip on Glass Bonding using Stressed Metal TM Technology," SID 05 Digest, 2005, 534-537.
Furneaux, et al., "The Formation of Controlled-Porosity Membranes from Anodically Oxidized Aluminium," Nature, 1989, vol. 337, 147-149.
Gally, B.J., "Wide-Gamut Color Reflective Displays using iMOD Interference Technology," SID 04 Digest, 2004, 654-657.
Giles, et al., "A Silicon Mems Optical Switch Attenuator and its Use in Lightwave Subsystems," IEEE Journal of Selected Topics in Quantum Electronics, 1999, 5 (1), 18-25.
"Glass Polarizing and Interference Filters," American Institute of Physics Handbook, 1982, pp. 6-172 to 6-178.
Goossen K.W. et al., "Possible Display Applications of the Silicon Mechanical Antireflection Switch," Society for Information Display, 1994.
Goossen K.W., "MEMS-Based Variable Optical Interference Devices," IEEE/Lens International Conference on Optical Mems, Conference Digest, Piscataway, NJ, USA, IEEE Aug. 21, 2000, pp. 17-18.
Gosch, "West Germany Grabs the Lead in X-Ray Lithography," Electronics, 1987, 78-80.
Heines, et al., "Bi-Stable Flat-Panel Display Based on a 180 [Deg.] Flipping Pixel," Proceedings of the SPIE: The International Society for Optical Engineering, 2002, vol. 4712, 327-335.
Howard, et al., "Nanometer-Scale Fabrication Techniques," VLSI Electronics: Microstructure Science, 1982, vol. 5, 145-153, 166-173.
Ibbotson, et al., "Comparison of XeF.sub.2 and F-atom Reactions with Si and SiO.sub.2," Applied Physics Letters, 1984, 44(12), 1129-1131.
Jackson, "Classical Electrodynamics," John Wiley & Sons Inc, 1962, pp. 568-573.
Jerman, et al., "A Miniature Fabry-Perot Interferometer Fabricated Using Silicon Micromachining Techniques," IEEE Electron Devices Society, 1988.
Joannopoulos, et al., "Photonic Crystals Molding the Flow of Light," Princeton University Press, 1995.
Johnson, "Optical Scanners," Microwave Scanning Antennas, 1964, vol. 1(2), 251-261.
Kim, et al., "Control of Optical Transmission Through Metals Perforated With Subwave-Length Hole Arrays," Optic Letters, 1999, vol. 24(4), 256-258.
Li G.P., "On the Design and Fabrication of Electrostatic RF MEMS Switches," Final Report 1999-00 for Micro Project 99-071.
Lieberman, "MEMS Display Looks to give PDAs Sharper Image." EE Times (2004).
Lieberman, "MEMS Display Looks to Give PDAs Sharper Image," EE Times (Feb. 11, 1997).
Lieberman, "Microbridges at heart of new MEMS displays" EE Times (2004).
Light Over Matter Circle No. 36, Jun. 1993.
Lin, et al., "Free-Space Micromachined Optical Switches for Optical NetWorking," IEEE Journal of Selected Topics in Quantum Electronics, 1999, vol. 5(1), 4-9.
Little, et al., "Vertically Coupled Glass Microring Resonator Channel Dropping Filters," IEEE Photonics Technology Letters, Feb. 1999, 11(2), 215-217.
Magel G.A., "Integrated Optic Devices using Micromachined Metal Membranes," SPIE, 1996, vol. 2686, 54-63.
Mait, "Design of Diffractive Optical Elements for Optical Signal Processing," IEEE Lasers and Electro-Optics Society Annual Meeting, 1993, 59-60.
Miles M., et al., "Digital Paper (TM) for reflective displays", Journal of the Society for Information Display, Society for Information Display, vol. 11 (1), pp. 209-215, 2003 ,XP002358929, ISSN: 1071-0922.
Miles M.W. et al., 5.3 Digital PaperTM Reflective Displays using Interferometric Modulation, SID Digest, vol. XXXI, 2000, pp. 32-35.
Miles M.W., "MEMS-Based Interferometric Modulator for Display Applications," Proceedings of SPIE Conference on Micromachined Devices and Components V, Sep. 1999, SPIE vol. 3876, pp. 20-28.
Nagami, et al., "Plastic Cell Architecture: Towards Reconfigurable Computing for General-Purpose, 0/8186-8900," IEEE, 1998, 68-77.
Newsbreaks, "Quantum-trench devices might operated at terahertz frequencies", Laser Focus World, May 1993.
Obi et al., "Fabrication of Optical Mems in Sol/Gel Materials," IEEE/LEOS International Conference on Optical Mems, 2002, Conference Digest, pp. 39-40.
Oliner, "Radiating Elements and Mutual Coupling," Microwave Scanning Antennas, 1966, vol. 2, 131-157 and pp. 190-194.
Oz, et al., "CMOS-Compatible RF-MEMS Tunable Capacitors," IEEE MTT-S International Microwave Symposium IMS, 2003, A97-A100.
Pacheco, et al., "Design of Low Actuation Voltage RF MEMS Switch," IEEE (2000), 0-78035687-X/00/ Radiation Laboratory and Center in Microsystems Department of Electrical Engineering and Computer Science University of Michigan.

(56) References Cited

OTHER PUBLICATIONS

Peerlings et al., "Long Resonator Micromachined Tunable GaAs-AlAs Fabry-Perot Filter," IEEE Photonics Technology Letters, IEEE Service Center, 1997, vol. 9(9), 1235-1237.
Peroulis et al., "Low contact resistance series MEMS switches", 2002, pp. 223-226, vol. 1, IEEE MTTS International Microwave Symposium Digest, New York, NY.
Petschick, et.al., "Fabry-Perot-Interferometer," available at http://pl.physik.tuberlin. de/groups/pg279/protokolless02/04_fpi.pdf, pp. 50-60, May 14, 2002.
Raley, et al., "A Fabry-Perot Microinterferometer for Visible Wavelengths," IEEE Solid-State Sensor and Actuator Workshop, 1992, 170-173.
Schnakenberg, et al., "TMAHW Etchants for Silicon Micromachining," International Conference on Solid State Sensors and Actuators-Digest of Technical Papers, 1991, 815-818.
Science and Technology, The Economist, pp. 89-90, (May 1999).
Seeger, et al., "Stabilization of Electrostatically Actuated Mechanical Devices," International Conference on Solid State Sensors and Actuators, 1997, vol. 2, 1133-1136.
Seeger J.I., et al., "Dynamics and Control of Parallel-Plate Actuators Beyond the Electrostatic Instability," Transducers '99, the 10th International Conference on Solid-State Sensors and Actuators, 1999, pp. 474-477.
Solgaard, et al., "Interference-Based Optical MEMS Filters," Optical 2004 Fiber Communication Conference, 2004, vol. 1.
Sperger, et al., "High Performance Patterned All-Dielectric Interference Colour Filter for Display Applications," SID Digest, 1994, 81-83.
Stone J.M., "Radiation and Optics, An Introduction to the Classic Theory," 1963, McGraw-Hill, pp. 340-343.
Tan, et al., "RF MEMS Simulation-High Isolation CPW Shunt Switches," Ansoft Global Seminars Delivering Performance, 2003.
Vaha-Heikkila, et al., "Design of Capacitive RF MEMS Power Sensor," available at <http://www.hut.fi/Units/Radio/URSI02/ursi.sub.—vaha-heikkila.pdf>- .VTT Information Technology, 2002.
Walker, et al., "Electron-Beam-Tunable Interference Filter Spatial Light Modulator," Optics Letters, 1988, vol. 13(5), 345-347.
Wang, et al., "Flexible Circuit-Based RF MEMS Switches," Proceedings of 2001 ASME International Mechanical Engineering Congress and Exposition, Nov. 11-16, 2001 pp. 757-762.
Weast Editor, CRC Handbook of Chemistry and Physics, 1979, 60th Edition, CRC Press, Inc., B-50, B-99.
Williams, et al., "Etch rates for Micromachining Processing Part II," Journal of Microelectromechanical Systems, Dec. 2003, 12(6), 761-778.
Winton et al., "A novel way to capture solar energy," Chemical Week, pp. 17-18 (May 15, 1985).
Wu, et al., "Design of a Reflective Color LCD using Optical Interference Reflectors," Asia Display, Changchun Institute of Physics, 1995, 929-931.
Wu, et al., "MEMS Designed for Tunable Capacitors," Microwave Symposium Digest, IEEE MTT-S Int'l., 1998, vol. 1, 127-129.
Zhou et al., "Waveguide Panel Display Using Electromechanism Spatial Modulators," SID Digest, 1998, vol. XXIX.

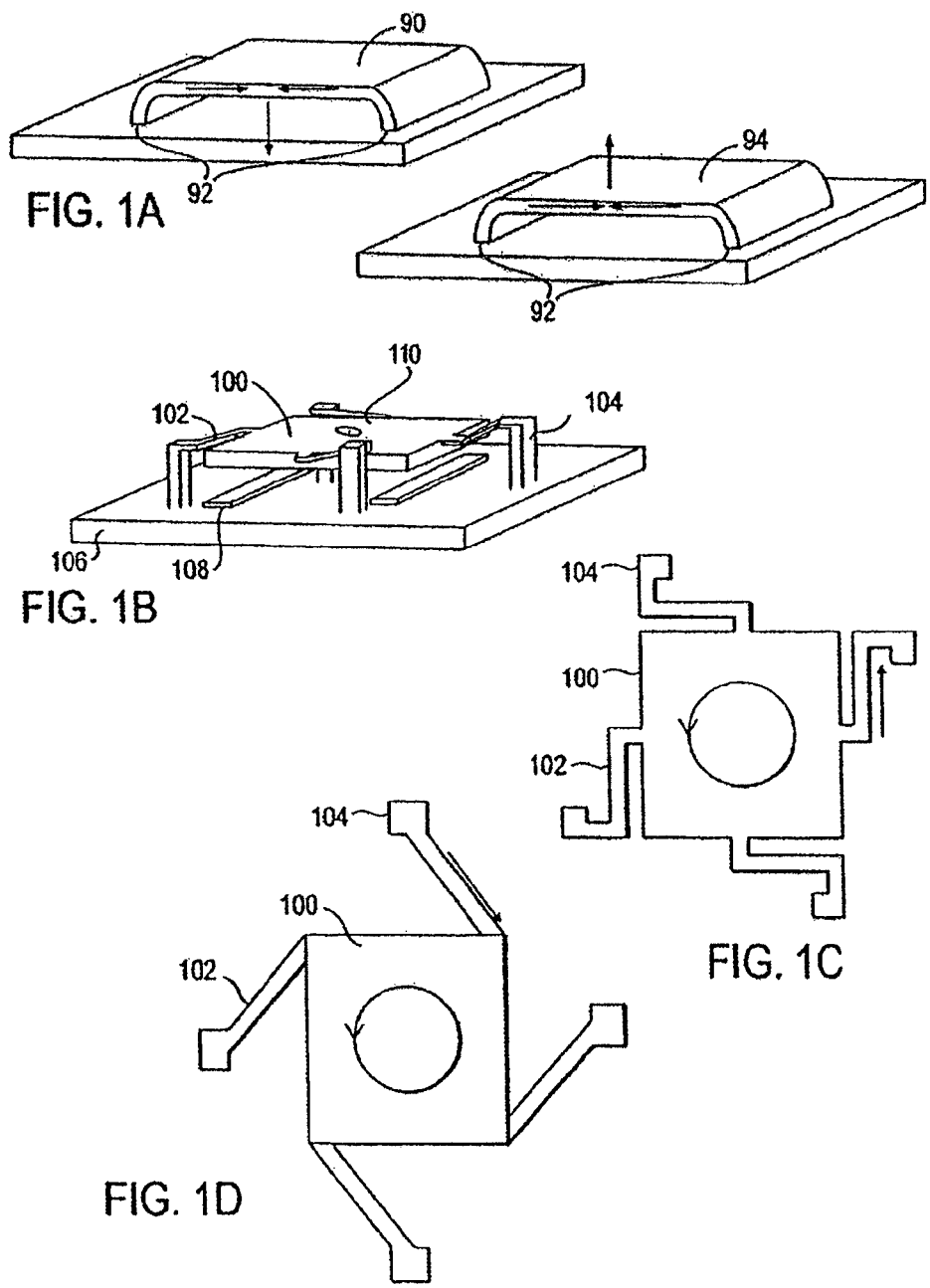

DEVICE FOR MODULATING LIGHT WITH MULTIPLE ELECTRODES

CROSS-REFERENCE TO RELATED APPLICATIONS

This application is a continuation of U.S. patent application Ser. No. 11/698,721, filed Jan. 26, 2007 (to be issued as U.S. Pat. No. 7,872,792), which is a continuation of U.S. patent application Ser. No. 11/056,571, filed Feb. 11, 2005 (now U.S. Pat. No. 7,379,227), which is a continuation of U.S. patent application Ser. No. 09/966,843, filed Sep. 28, 2001 (now U.S. Pat. No. 6,867,896), which is a divisional of U.S. patent application Ser. No. 09/056,975, filed Apr. 8, 1998 (now U.S. Pat. No. 6,674,562), the specifications of which are all incorporated by reference in the disclosure of this application.

BACKGROUND

This invention relates to interferometric modulation.

Interference modulators (IMods) are a broad class of devices that modulate incident light by the manipulation of admittance via the modification of the device's interferometric characteristics. Applications for such devices include displays, optical processing, and optical information storage.

The parent application describes two kinds of structures whose impedance, the reciprocal of admittance, can be actively modified so that they can modulate light. One scheme is a deformable cavity whose optical properties can be altered by electrostatic deformation of one of the cavity walls. The composition and thickness of these walls, which consist of layers of dielectric, semiconductor, or metallic films, allows for a variety of modulator designs exhibiting different optical responses to applied voltages.

One such design includes a filter described as a hybrid filter which has a narrow bandpass filter and an induced absorber. When the wall associated with the hybrid filter is brought into contact with a reflector, incident light of a certain range is absorbed. This occurs because the induced absorber matches the impedance of the reflector to that of the incident medium for the range of frequencies passed by the narrow-band filter.

SUMMARY

In general, in one aspect, the invention features an interferometric modulator comprising a cavity defined by two walls. At least two arms connect the two walls to permit motion of the walls relative to each other. The two arms are configured and attached to a first one of the walls in a manner that enables mechanical stress in the first wall to be relieved by motion of the first wall essentially within the plane of the first wall.

Implementations of the invention may include one or more of the following features. The motion of the first wall may be rotational. Each of the arms has two ends, one of the ends attached to the first wall and a second end that is attached at a point that is fixed relative to a second one of the walls. The point of attachment of the second end is offset, with reference to an axis that is perpendicular to the first wall, from the end that is attached to the second wall. The first wall has two essentially straight edges and one end of each of the arms is attached at the middle of one of the edges or at the end of one of the edges. A third arm and a fourth arm also each connects the two walls. The arms define a pinwheel configuration. The lengths, thicknesses and positions of connection to the first wall of the arms may be configured to achieve a desired spring constant.

In general, in another aspect, the invention features an array of interferometric modulators. Each of the interferometric modulators has a cavity defined by two walls and at least two arms connecting the two walls to permit motion of the walls relative to each other. The walls and arms of different ones of the modulators are configured to achieve different spring constants associated with motion of the walls relative to each other.

In general, in another aspect, the invention features a method of fabricating an interferometric modulator, in which two walls of a cavity are formed, connected by at least two arms. After the forming, a first one of the walls is permitted to move in the plane of the first wall relative to the arms to relieve mechanical stress in the first wall.

In general, in another aspect, the invention features an interferometric modulator comprising three walls that are generally parallel to one another. The walls are supported for movement of at least one of the walls relative to the other two. Control circuitry drives at least one of the walls to discrete positions representing three discrete states of operation of the modulator.

Implementations of the invention may include one or more of the following features. In one of the three discrete states, there is a gap between the first and a second of the two walls and a gap between the second and a third of the two walls. In a second of the three discrete states, there is a gap between the first and the second of the two walls and no gap between the second and the third of the two walls. In the third of the three discrete states, there is no gap between the first and the second of the two walls and no gap between the second and the third of the two walls. Each membrane includes a combination of dielectric, metallic, or semiconducting films.

In general, in another aspect, an interference modulator includes a cavity defined by two walls that are movable relative to one another to and from a contact position in which the two walls are essentially adjacent to one another. Spacers are mounted to form part of one of the walls to reduce the surface area over which the two walls touch in the contact position.

Implementations of the invention may include one or more of the following features. The spacers comprise electrodes and conductors feed current to the electrodes.

In general, in another aspect, the invention features an interference modulator comprising a cavity defined by two walls that are separated by a fluid-filled gap. The walls are movable relative to each other to change the volume of the gap. An aperture (e.g., a round hole in the center) in one of the walls is configured to control the damping effect of fluid moving into or out of the gap as the volume of the gap changes. In implementations of the invention, the aperture comprises a round hole in the center of the wall.

In general, in another aspect, the invention features an interference modulator comprising at least two walls that are movable relative to each other to define a cavity between them. The relative positions of the walls define two modes, one in which the modulator reflects incident light and appears white and another in which the modulator absorbs incident light and appears black. In implementations, one of the walls may include a sandwich of a dielectric between metals, and the other of the walls may comprise a dielectric.

In general, in another aspect, the invention features an interferometric modulator comprising a cavity defined by two walls with at least two arms connecting the two walls to permit motion of the walls relative to each other. The response time of the modulator is controlled to a predetermined value by a combination of at least two of: the lengths of the arms, the thickness of one of the walls, the thickness of the arms, the presence and dimensions of damping holes, and the ambient gas pressure in the vicinity of the modulator.

In general, in another aspect, the invention features an interferometric modulator comprising a cavity defined by two walls, at least two arms connecting the two walls to permit motion of the walls relative to each. The modulator includes a charge deposition mitigating device includes at least one of actuation rails or the application of alternating polarity drive voltages.

In general, in another aspect, the invention features an interferometric modulator comprising a cavity defined by two walls held by a support comprising two materials such that the electrical or mechanical properties of the mechanical support differ at different locations in a cross-section of the mechanical support.

Implementations of the invention may include one or more of the following features. The support may include a laminate of two or more discrete materials or a gradient of two or more materials. The two materials exhibit respectively different and complementary electrical, mechanical, or optical properties.

In general, in another aspect, the invention features, a method for use in fabricating a microelectromechanical structure, comprising using a gas phase etchant to remove a deposited sacrificial layer. In implementations of the invention, the MEMS may include an interference modulator in which a wall of the modulator is formed on the substrate and the gas phase etchant may remove the sacrificial layer from between the wall and the substrate. The gas phase etchant may include one of the following: XeF2, BrF3, ClF3, BrF5, or IF5.

In general, in another aspect, the invention features a method of making arrays of MEMS (e.g., interference modulators) on a production line. Electronic features are formed on a surface of a glass or plastic substrate that is at least as large as 14".times.16", and electromechanical structures are micromachined on the substrate. In implementations of the invention, the steps of forming the electronic features overlap (or do not overlap) with steps of micromachining the structures.

Other advantages and features will become apparent from the following description and from the claims.

BRIEF DESCRIPTION OF THE DRAWINGS

FIG. 1A is a perspective view of a double clamped IMod.
FIG. 1B is a perspective view of an IMod with pinwheel tethers and a damping hole.
FIG. 1C is a top view of an IMod with pinwheel tethers and a damping hole.
FIG. 1D is a top view of an IMod with straight tethers.

DETAILED DESCRIPTION

Figure 2A:
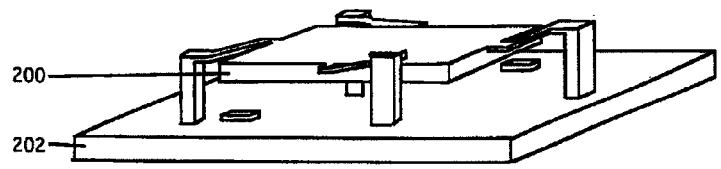
FIG. 2A shows a perspective view of a black and white IMod.

The optical impedance, the reciprocal of admittance, of an IMod can be actively modified so that it can modulate light.

One way of doing this (some aspects of which are described in U.S. patent application Ser. No. 08/238,750 filed May 5, 1994, and incorporated by reference) is by a deformable cavity whose optical properties can be altered by deformation, electrostatically or otherwise, of one or both of the cavity walls. The composition and thickness of these walls, which comprise layers of dielectric, semiconductor, or metallic films, allow for a variety of modulator designs exhibiting different optical responses to applied voltages. This scheme can be considered a form of microelectromechanical structure/system (MEMS).

Another way of actively modifying the impedance of an IMod (some aspects of which are described in U.S. patent application Ser. No. 08/554,630, filed Nov. 6, 1995, and incorporated by reference) relies on an induced absorber to regulate the optical response. Such an IMod may operate in reflective mode and can be fabricated simply and on a variety of substrates.

Both the deformable and induced absorber schemes typically work in a binary mode, residing in one of two states, or an analog or tunable mode, residing in one of a continuous range of states. The difference between these two modes is based primarily on the mechanical design of the IMod structure.

Some applications could use a multi-state IMod that can reside in more than two states based on its mechanics and structure. A multi-state IMod can offer several advantages from both an optical performance and digital driving perspective.

Structural components in MEMS may exhibit residual film stress, the tendency of a deposited film, say of aluminum, to either shrink and crack (tensile stress) or push outward and buckle (compressive stress). A variety of factors contribute to the nature and magnitude of this stress. They include parameters of the deposition process as well as the temperature of the substrate during the deposition.

Control of this stress determines, in part, the forces required to actuate the structures as well as the final shapes of the structures. For example, a self-supporting membrane with very high residual stress may require prohibitively high driving voltages to actuate. The same membrane also may twist or warp due to these forces.

Actuation voltage, electromechanical behavior, and final shape are important characteristics of IMods. Some device applications exploit the electromechanical properties. Large area displays, for example, can take advantage of the inherent hysteresis of these structures in order to provide "memory" at the pixel location. However this requires that the IMods in a given array behave in a nearly identical fashion. Since their behavior is determined by the mechanical properties of the materials, among them residual stress, the films must be deposited with great consistency over the area of the display. This is not always readily attainable.

FIG. 1A is an illustration of one IMod structural design, which has been discussed in previous patent applications. This design can be described as a "double clamped" beam in that it consists of a self-supporting beam go which is supported, or clamped, on both ends 92. When this structure is subject to residual stress, the height of the membrane (the beam) can increase or decrease depending on whether the stress is compressive or tensile respectively. In FIG. 1A, membrane 90 is shown in a state of tensile stress, which causes the membrane to shrink in area. Because the structure is bound to the substrate at points 92, the membrane height is decreased due to this shrinkage. Conversely membrane 94, shown in compressive stress, attempts to expand with the end result being a net increase or decrease in height or overall bowing of the structure.

FIG. 1B shows an improvement to this design. In this case, the movable secondary mirror 100 is connected to support posts 104 via tethers 102. The IMod is fabricated on substrate 106, and incorporates stiction bumps 108. The structure has advantages with respect to residual stress. In particular, because tethers 102 are tangential to secondary mirror 100, residual stress in the material will have a tendency to be relieved by causing the mirror 100 to twist in a clockwise direction or counter clockwise direction if the stress is compressive or tensile.

This twist is illustrated for a tensile case in FIG. 1C. Because a tensile film has a tendency to shrink, the sides of secondary mirror 100 are pulled towards the support posts 104 with which they are associated, while the mirror remains in its original plane. The twisting relieves the residual stress of the structure. This stress relief occurs after the last step of the IMod fabrication when a supporting sacrificial spacer is removed from beneath the structure. Depending on the overall design of the IMod, a certain amount of structural rotation can be tolerated. Consequently, minute variations of residual stress across the expanse of a display array are mitigated or eliminated because each IMod rotates to its individual stress relieved position, all without affecting the optical properties.

The other consequence of this relief is that stress no longer contributes, or contributes much less, to the electromechanical behavior of the device. Device characteristics such as voltage and resonant frequency are thus determined primarily by factors such as modulus of elasticity and film thickness. Both of these characteristics are more easily controlled during deposition.

FIG. 1D illustrates another geometry for a stress relieving structure relying on straight tethers 102. In this case, the mirror is rotating clockwise to relieve compressive stress. Other tether configurations, including curved or folded, are also possible, Referring again to FIG. 1B, a micro-electromechanical structure has a tendency to stick to a surface of a substrate that it touches during operation. Structures that minimize the area of contact between movable membrane 100 and the substrate can mitigate this phenomenon. Stiction bumps 108 can provide this mechanism by acting as supports which contact the membrane only over a relatively small area. These structures can be fabricated using the micromachining techniques described in the previous patent applications. They can also act as bottom electrodes if suitably insulated, and exhibit certain advantages over previously described designs, which will be discussed below. In this role they may be referred to as actuation rails. These structures may also be fabricated on the movable membrane.

Referring again to FIG. 1B, damping hole 110 also enhances the performance of this structure. When the membrane is actuated i.e., pulled downward, the air between it and the substrate must be displaced. The same volume of air must be replaced when the membrane is allowed to deflect back to its quiescent position. The energy required to move this volume of air has the effect of slowing the motion of the membrane or damping its behavior. Damping is both a detriment and an advantage. Minimizing the response time of these devices is important in order to support the necessary display data rates, thus the desire exists to minimize damping. However it is also important to bring the membrane to fixed position very quickly in order to reduce the amount of light reflected, over time, which is not of the desired color. With insufficient damping, such a membrane can experience ringing, or decaying oscillation, when it is released into the undriven state. This should be minimized, and is also determined in part by damping.

One method of optimizing damping is to provide a damping hole through the body of the membrane. The hole serves to provide a supplementary path for the air during the motion of the membrane. The force required to displace and replace the air is thus lessened, and the effect of damping reduced. Thus choosing the size of the hole during manufacture provides a mechanism for manipulating the amount of damping the IMod experiences, and therefore its response time. Stiction ps, 108, can also assist in minimizing damping. They do so by maintaining a finite distance between the membrane and substrate so that there is a path for airflow, between the membrane and the substrate, when the membrane is fully actuated.

Another method for optimizing damping relies on control of the ambient gas pressure, Any IMod device, as described in previous patent applications, will be packaged in a container that provides a hermetic seal, using an inert gas. This prevents the introduction of both particulate contaminants as well as water vapor, both of which can degrade the performance of the IMod over time. The pressure of this gas has a direct bearing on the amount of damping that the packaged devices will experience. Thus, the damping, and response time, may also be optimized by determining the ambient gas pressure within the packaging during manufacture.

A key metric of performance in a reflective flat panel display is its brightness. Most of these displays achieve color spatially, that is each pixel is divided into three sub-pixels corresponding to the colors red, blue, and green. White is achieved by maximizing the brightness of all three sub-pixels. Unfortunately, since each sub-pixel utilizes only about ⅓ of the light incident upon it, the overall brightness of the white state can be low.

This can be resolved by utilizing a sub-pixel structure that is capable of directly achieving a white state, in addition to a particular color. In this fashion, the overall brightness of the display can be increased because a sub-pixel in a white state utilizes a significantly higher fraction of the light incident upon it. The IMod design described in patent application Ser. No. 08/554,630 is capable of reflecting either a particular color or exhibiting a "black" or absorbing state. This design can be modified to include alternative states.

Figure 2B:
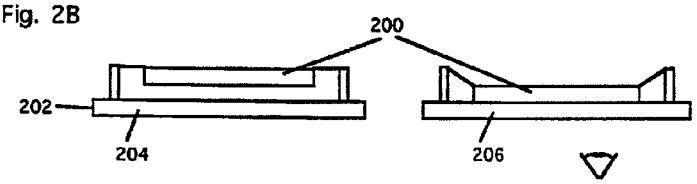
FIG. 2B shows a side view of the IMod in two states.

FIG. 2A shows a perspective view of an arrangement that is capable of a black state and a white state, and illustrates the previously described tether configuration. (The double-clamped membrane of FIG. 1A is also a usable mechanical design though with the mentioned sensitivities to stress.) FIG. 2B shows the IMod in the two states with 204 being the undriven state, and 206 being the driven state. In the driven state the IMod absorbs incident light and appears black to a viewer looking through substrate 202. In the undriven state, the IMod appears white.

Figure 2C:
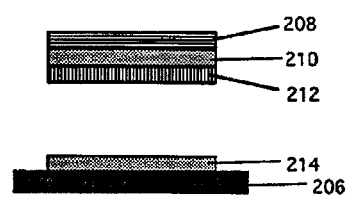
FIG. 2C illustrates the thin film structure of the IMod.
Figure 2D:
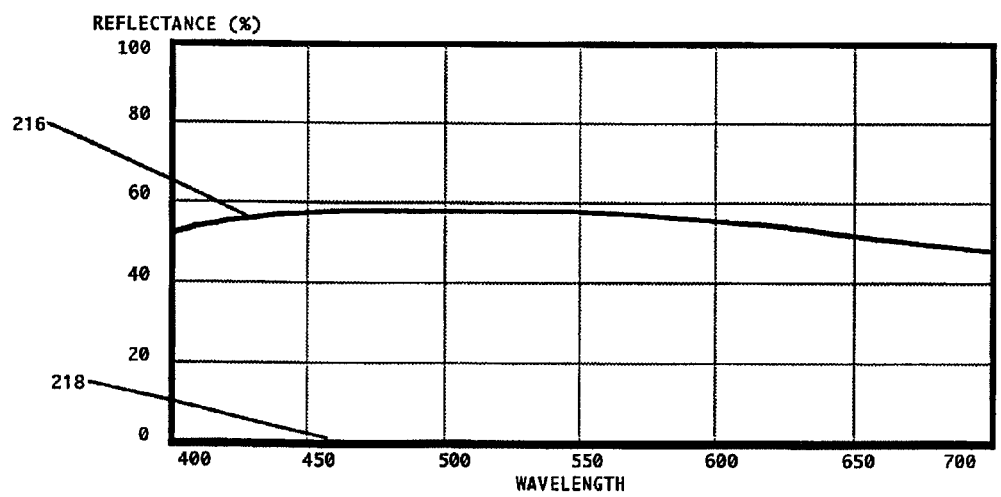
FIG. 2D shows the spectral reflectance function of the IMod in its two states.
Figure 3A:
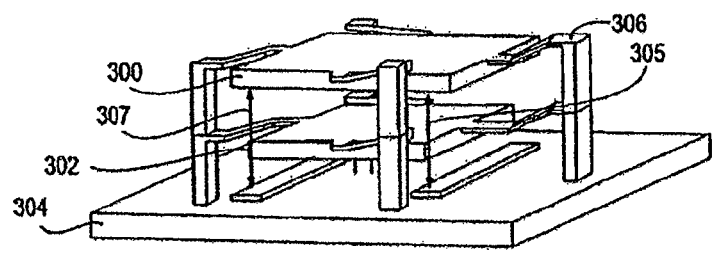
FIG. 3A shows a perspective view of a multi-state IMod.
Figure 3B:
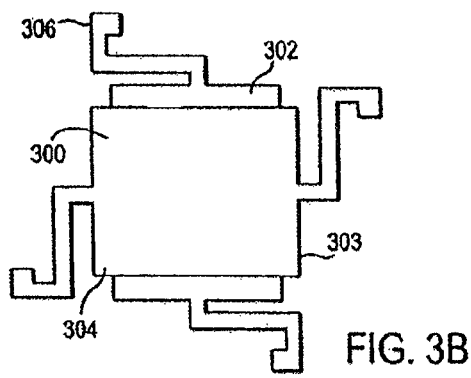
FIG. 3B shows a top view.

FIG. 2C reveals details of the films involved. Movable membranes 208, 210, and 212, comprise three films of a metal, a dielectric, and a metal, respectively. One example could utilize aluminum of 400 nanometers (nm) thick for metal 208, silicon dioxide of 50 nm for dielectric 210, and tungsten of 14.9 nm for metal 212. Dielectric 214 could comprise a film of zirconium dioxide 54.36 nm thick, residing on substrate 26. FIG. 2D illustrates the spectral reflectance function of this IMod design in the two states. Curves 216 and 218 reveal the reflectivity of the IMod in the white state and the black state, respectively FIG. 3A is a variation that is capable of three states. In this design, the thin film stack of the design in FIG. 2A has been broken into separate movable membranes. Membrane 300 is a metal, 400 nm of aluminum in this case, and membrane 302 is also a metal, 14 nm of tungsten for example. Because the tungsten is so thin, optically neutral structural films may be required to provide the requisite mechanical integrity, which could be in the form of a supporting frame. The air gap between the two membranes functions as the dielectric. FIG. 3B shows a top view of this IMod revealing detail of how actuation would occur. One complication of this design is that conducting membrane 302 shields membrane 300 from the electric fields produced by the stiction/actuation bumps. Lengthening membrane 300 at regions 303, 304 so that it extends beyond the footprint of membrane 302 allows membrane 300 to "see" the electric fields via paths 305, 307 and thus be acted upon by them.

Figure 3C:
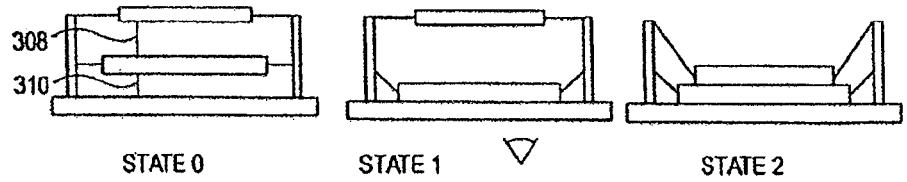
FIG. 3C shows a side view of the IMod in three states.
Figure 3D:
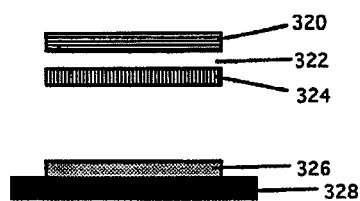
FIG. 3D illustrates the thin film structure of the IMod.
Figure 3E:
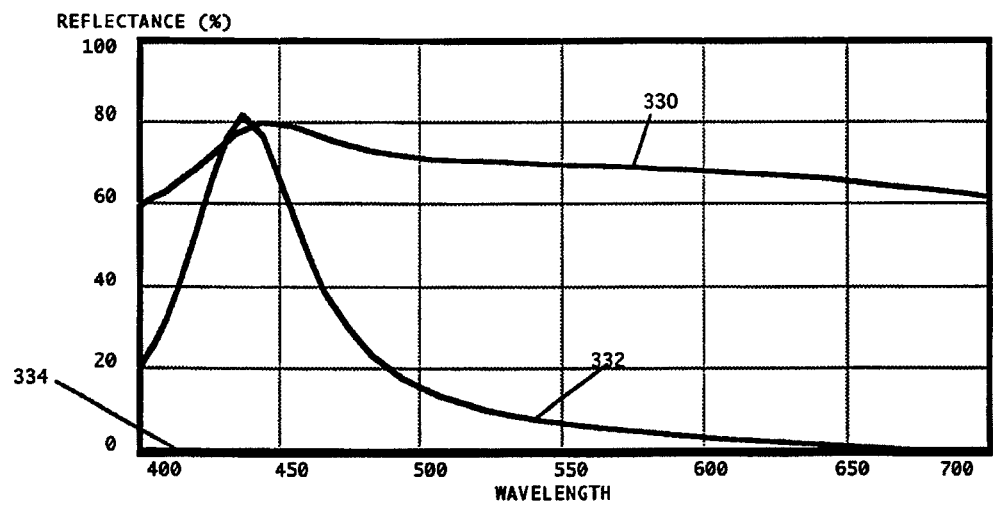
FIGS. 3E, 3F, and 3G show spectral reflectance functions of a green/white/black IMod, a red/white/black IMod, and a blue/white/black IMod, respectively.
Figure 3F:
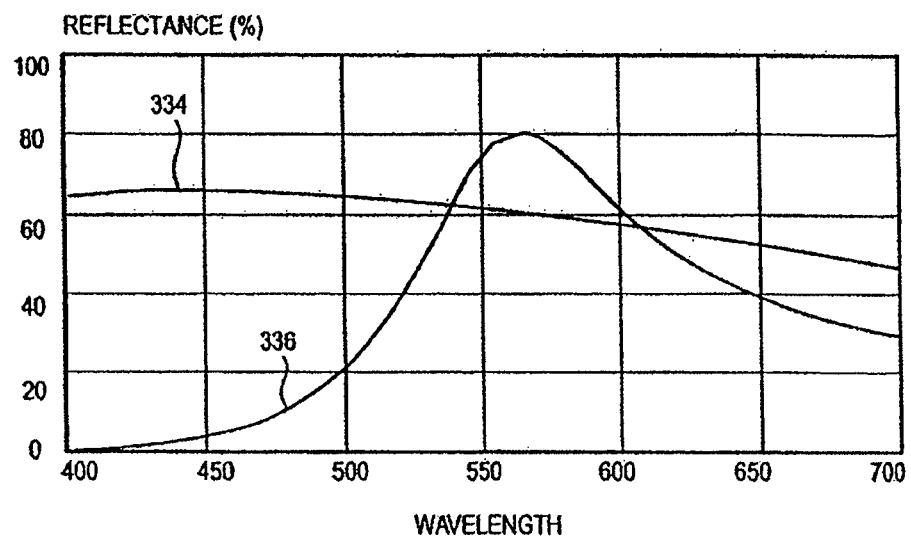
Figure 3G:
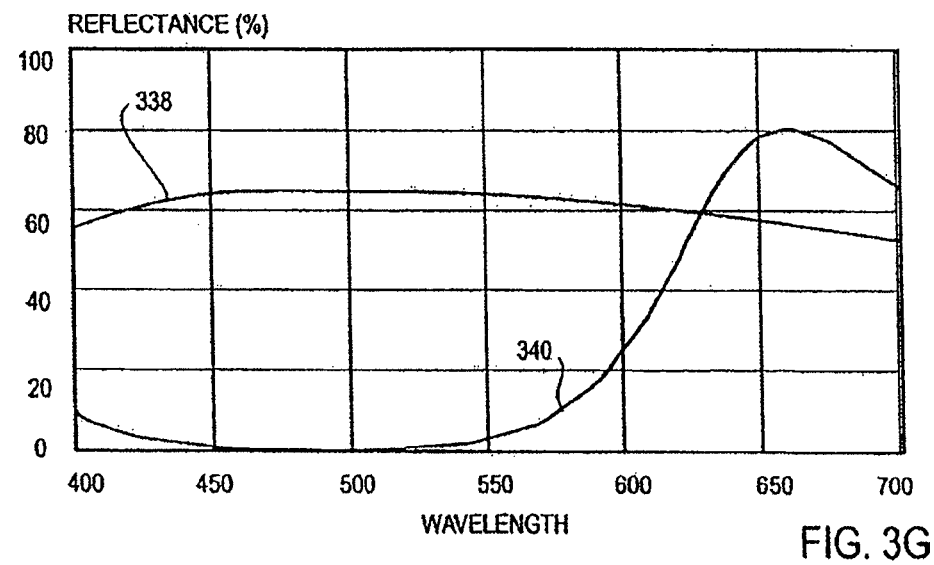

The three possible mechanical states, and associated dimensions, are illustrated in FIG. 3C. Airgap dimensions 308 and 310 could be 215 nm and 135 nm. FIG. 3D reveals detail of the thin films involved. Film 320 is a metal, 322 is an airgap which serves as a dielectric, 324 is also a metal, and 326 is a dielectric. FIG. 3E is a spectral reflectance plot of the three states. For the dimensions indicated, a black state (e.g. state 2), a blue state (state 0), and a white state (state 1) are possible, with the black, blue and white states corresponding to spectral reflectance plots, 334, 332, and 330. FIG. 3F shows plots for an IMod with green and white states 336 and 334, while FIG. 3G shows plots for an IMod with red and white states 340 and 338.

Like all IMods, this design exhibits electromechanical hysteresis, though it is more complicated than an IMod with only two states. There is a minimum voltage which, when applied, is sufficient to keep one or both membranes in a driven or actuated state despite the mechanical forces which seek to return them to their relaxed positions.

Figure 4A:
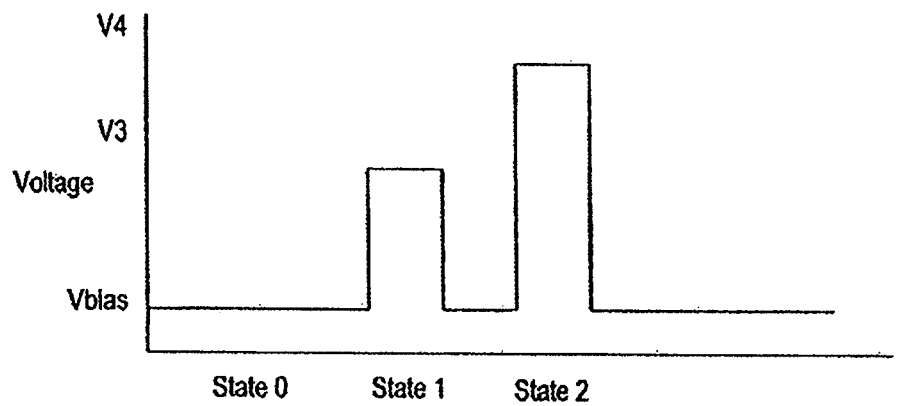
FIG. 4A shows the relationship between the multi-state IMod's states and the drive voltage.
Figure 4B:
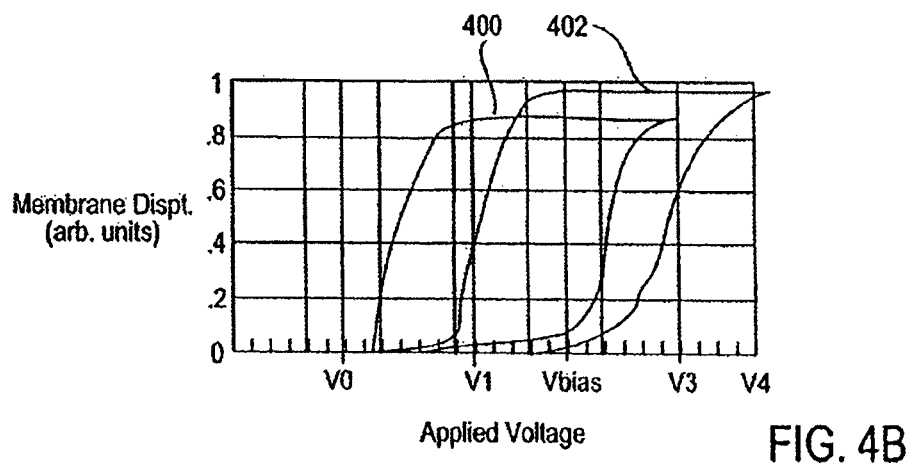
FIG. 4B shows the related electromechanical hysteresis curves.
Figure 4C:
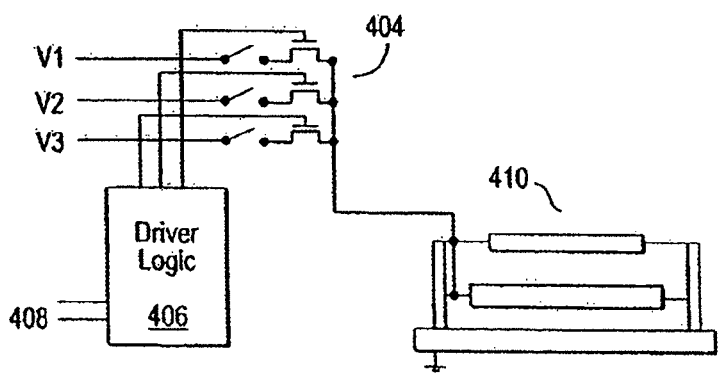
FIG. 4C illustrates one part of a drive circuit.

FIG. 4A is a representative plot showing the relationship between applied voltage and the state of the IMod. A minimum bias, Vbias, is required to maintain the IMod in the state into which it has been driven. State 1 and State 2 are achieved by the application of voltages V3 and V4. The related hysteresis diagram is shown in FIG. 4B, with curve 400 corresponding to the electromechanical response of movable plate 302 of FIG. 3A, and curve 402 corresponding to that of movable plate 300. Vbias resides at the average of the centers of the two curves. FIG. 4C illustrates one part of a drive circuit required to actuate such a device. Output stage 406 consists of three transistors or other suitable switches that are connected in parallel to three different voltage sources, and the two movable plates of the IMod. Driver logic 404 responds to input signals 408 in a way that allows for the selection, via the output stage, of one particular voltage to be applied to the movable membranes of IMod 410. When no voltage is applied, the IMod's membranes move to their relaxed state via mechanical forces.

Figure 5A:
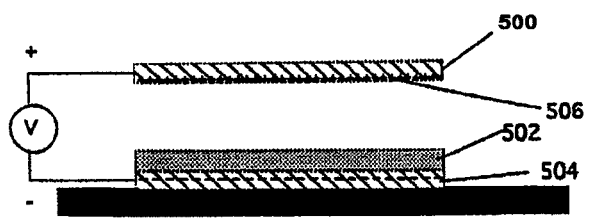
FIG. 5A shows an IMod, illustrating the effects of charge injection, in the undriven state.
Figure 5B:
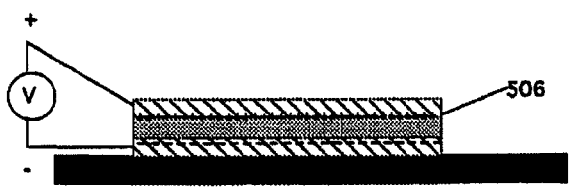
FIG. 5B shows the IMod driven.
Figure 5C:
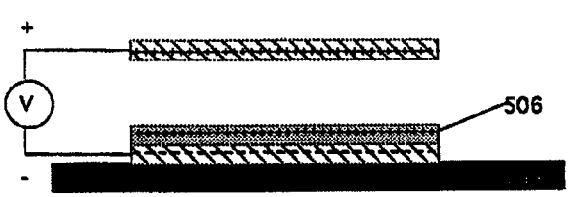
FIG. 5C shows the IMod undriven after charge transfer.

Another issue that can be encountered in movable membrane structures is that of charge deposition, a phenomenon illustrated in FIGS. 5A-5C. In FIG. 5A, a voltage is applied between movable plate 500 and fixed plate 504. Layer 502 is an insulating film that resides on top of fixed plate 504. If the applied voltage is sufficient to actuate the movable plate and it comes into contact with the. insulator, as it does in FIG. 5B, it may deposit charge 506 on the insulator. One consequence of this is that the attractive force between plates 500 and 504 is reduced, and a higher voltage must be applied in order to achieve actuation (FIG. 5C).

Figure 5D:
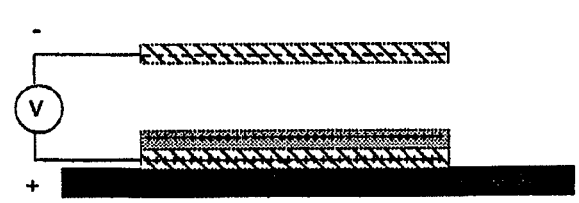
FIG. 5D shows the IMod with reverse polarity applied.
Figure 5E:
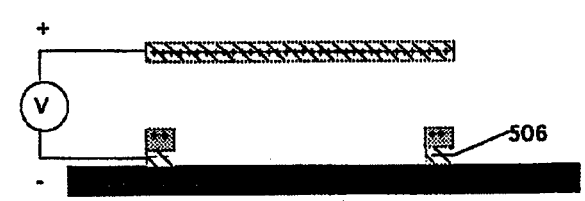
FIG. 5E shows the IMod shows a reduced area electrode configuration, which reduces the effects of charge injection, as well as providing a higher resistance to electrical shorts.

This condition can be resolved by applying alternating voltages to the structure. That is, for every intended actuation, change the polarity of the voltage that is applied such that the deposited charge is canceled out or actually exploited. FIG. 5D illustrates the effect of applying a reverse polarity. The other alternative is to eliminate the solid insulator and replace it with air. FIG. 5E illustrates the use of stiction bumps or actuation rails to accomplish this goal. Charge may still accumulate on these structures, but the area is much smaller, and therefore the accumulated charge is decreased. Reverse polarity and stiction bumps may also be used together.

Electrical shorts are another concern for these devices. Referring again to FIG. 5A, the surface area of both the movable membrane (top electrode) 500 and the bottom electrode 504 are equivalent. When the device is actuated (FIG. 5B), pinholes in the insulator, 502, could lead to electrical shorts and device failure. Utilizing a configuration like that shown in FIG. 5E can mitigate this issue by reducing the surface area of the surface electrode so that the probability of a short producing pinhole is reduced. The surface electrode, or stiction/actuation rail, serves the aforementioned function of stiction mitigation as well. Like stiction bumps, they may be fabricated on the movable membrane instead.

Another issue that complicates the fabrication of a display based on IMods is the manufacturing of a full-color display. Since different colors in an IMod are achieved by the undriven spacing of the IMod, an array with three different colors will have subarrays of IMods with three different gap sizes. Consequently, there will be three different electromechanical responses for the driving electronics to contend with. The damping holes are one technique for compensating for the variation in electromechanical response from color to color.

Figure 6:
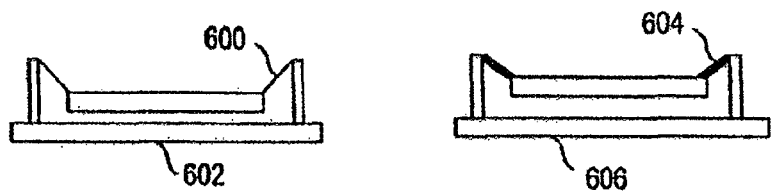
FIG. 6 is a side view of two IMods illustrating a mechanism to alter the spring constant.

Another technique is to vary the thickness of either the membrane, in the double clamped IMod, or the tether thickness in the tether supported IMod. The latter technique is illustrated in FIG. 6. Tether 600 on IMod 602 is fabricated so that it is thinner than tether 604 on IMod 606. With the same bias voltage applied to both, IMod 602 is displaced further than IMod 606 because of its lower spring constant. Less force is required to actuate this structure and its mechanical response time is lower, and it is the mechanical response time that tends to dominate. This effectively changes the overall electromechanical response of the device and thus provides a way to compensate for spacing variation. The same technique applies to the double clamped design only the thickness of the entire membrane, or major parts of it, are varied. By way of example, an IMod that is red and therefore has a longer mechanical response time because of the greater undriven spacing, can be fabricated with a higher spring constant. This makes it possible to match its actuation time to that of, say, the blue IMod.

In the tether supported IMod, the spring constant could be determined by lengths of the tether arms. A longer tether results in a lower spring constant and a shorter tether produces a higher constant. This could be accomplished, in the same amount of total device space, by varying the position along the edge of the movable membrane to which the tether is attached. Thus, a tether connected to the center of the membrane edge would have a lower (a higher) than one connected to the nearer (the farther) end, respectively.

The concept of decoupling the optical properties of the movable membrane from the structural properties was discussed in the previous patent application. The fundamental idea is to fabricate a structure with separate elements designed and optimized to provide the required mechanical and structural characteristics and, independently, the required optical properties.

Figure 7A:
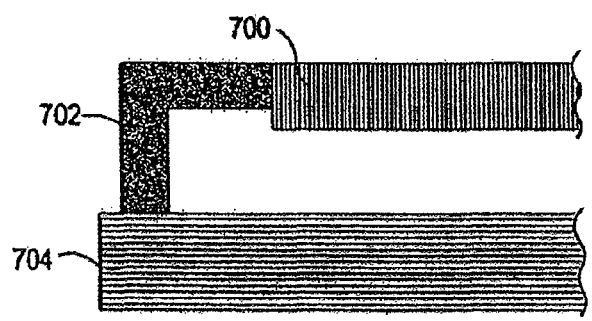
FIG. 7A shows a single material membrane tether support.

FIG. 7A reveals more detail about one possible approach. In this case the movable membrane, 700, is selected purely on the basis of it optical properties and membrane tether, 702, for its advantageous mechanical properties. Aluminum, for example, has already been shown to be useful in several IMod designs from an optical perspective, though mechanically it is subject to fatigue and stress fractures. A more suitable material might be a dielectric like aluminum oxide, silicon oxide or silicon nitride, which could be used to construct the tether.

Figure 7B:
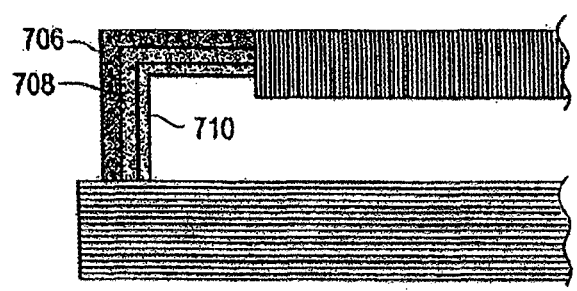
FIG. 7B shows an alloyed or graded material membrane tether support.

FIG. 7B illustrates a variation on the theme where the tether is composed of either a laminated or graded material. In a laminated material, layers 706 and 710 might comprise films of aluminum oxide, providing good mechanical strength, and film 708 could be aluminum, providing electrical conductivity. For a graded material, layers 710-706 could be composed of a continuously varied material that is deposited so that at the inner surface it is pure aluminum, and at the outer surface it is pure aluminum oxide. This approach should be mechanically more robust than the laminate. Other manifestations of this technique are possible, including the use of different materials as well as alternate material variations.

The general fabrication process described in the previous patent applications relies on the concept of surface micromachining, where a sacrificial layer is deposited, a structure is formed on top of it, and the sacrificial layer is etched away. One etch chemistry of particular interest utilizes a gas-phase etchant to remove the sacrificial layer. Candidates include gases known as $XeF_2$, $BrF_3$, $ClF_3$, $BrF_5$, and $IF_5$. These gases have the advantageous property of etching materials such as silicon and tungsten spontaneously, and without the need for a plasma to activate the etch process. Because it is a gas phase etch, as opposed to a wet etch, the sacrificial etch step is much less complicated and provides additional flexibility in the kinds of structural materials which may be used. Furthermore it facilitates the fabrication of more elaborate devices with complex internal structures.

Display applications, in general, require the ability to fabricate on relatively large substrates. While many finished display devices can be smaller than 1 square inch, most direct view displays start at several square inches and can be as large as several hundred square inches or larger. Additionally, these displays utilize glass or plastic substrates that are not found in traditional semiconductor manufacturing plants. MEMS, which are primarily both silicon based and fabricated on silicon substrates, have been historically fabricated in semiconductor type facilities. However the need to fabricate large arrays of MEM devices on large substrates, a need which is exemplified by an IMod based display, cannot be served using traditional semiconductor manufacturing practices or facilities.

Alternatively, there exists a large and growing base of facilities that could also be applied to the manufacture of large arrays of IMods and other MEMS. This manufacturing base comprises facilities and factories that are currently used to manufacture Active Matrix LCDs. The book "Liquid Crystal Flat Panel Displays", by William C. O'Mara, is incorporated herein by reference. These facilities are appropriate because the bulk of the fabrication process is related to the active matrix component, i.e. the thin film transistor (TFT) array that drives the LCD.

While there exist a variety of TFT fabrication processes, they all share several components which make them amenable to the fabrication of large area surface micromachined MEMS. First, the substrate of choice is glass or plastic, which is readily available in large sized formats. In addition, key materials deposited include silicon, tungsten, molybdenum, and tantalum, all of which are suitable sacrificial materials for gas phase etchants, as well as tantalum pentoxide, silicon dioxide, silicon nitride, and aluminum, which are suitable optical, insulating, structural, optical, and conducting materials. In general, all photolithography, process tooling, and testing are oriented towards large arrays and large area devices. Finally, the process for fabricating the TFTs can be utilized to fabricate electronics in conjunction with the MEM devices in order to provide driver circuitry and intelligent logic functions. Thus in conjunction with the gas phase etch, Active Matrix LCD fabs and their associated processes provide a readily usable manufacturing vehicle for IMod based displays in particular, and large area (at least as large of 14"×16") MEM devices in general.

Two general approaches for fabricating TFTs and IMods or other MEM devices can be described as decoupled and overlapping. In the former the requisite TFT based circuitry is fabricated first, and then the IMods are fabricated subsequently. A more efficient approach is to fabricate the TFT array and the IMod array in a way that allows the sharing or overlapping of steps in each process. A representative TFT process sequence is shown in the following:

1. Deposit gate metal (molybdenum or tantalum for example).
2. Pattern gate metal.
3. Deposit insulator and amorphous silicon.
4. Pattern insulator and silicon.
5. Deposit display electrode (aluminum for example).
6. Pattern display electrode.

7. Deposit source/drain/signal line metal (aluminum).
8. Pattern source/drain/signal line.
9. Pattern silicon.
10. Deposit passivation film.

A representative IMod process sequence is shown in the following:

1. Deposit dielectric/primary mirror (molybdenum or tantalum for primary mirror).
2. Pattern primary mirror.
3. Deposit insulator and amorphous silicon.
4. Pattern insulator and silicon.
5. Deposit secondary mirror (aluminum)
6. Pattern secondary mirror.
7. Etch sacrificial material (silicon).

Comparison of these two process sequences reveals that steps 1-6 are functional equivalents on a fundamental level and, obviously, located at the same place in their respective sequences. This similarity benefits both the decoupled and overlapping processes in several ways. First, similarity in materials minimizes the total number of dedicated deposition tools required, as well as the number of etchant chemistries. Second, identical location of equivalent steps streamlines the overall process flow. Finally, for an overlapping process, some of the steps can be shared. The consequence of this is an overall reduction in the total number of process steps required to fabricate both the IMod array and the TFT circuitry, reducing both complexity and cost. In general the process and facilities for manufacturing the active matrix component of the AMLCD would appear to be ideally suited for IMod fabrication.

Any thin film, medium, or substrate (which can be considered a thick film) can be defined in terms of a characteristic optical admittance. By considering only the reflectance, the operation of a thin film can be studied by treating it as an admittance transformer. That is, a think film or combination of thin films (the transformer) can alter the characteristic admittance of another thin film or substrate (the transformed film) upon which it is deposited. In this fashion a normally reflective film or substrate may have it's characteristic admittance altered (i.e., transformed) in such a way that its reflectivity is enhanced and/or degraded by the deposition of, or contact with, a transformer. In general there is always reflection at the interface between any combination of films, mediums, or substrates. The closer the admittance of the two, the lower the reflectance at the interface, to the point where the reflectance is zero when the admittances are matched.

Figure 8:
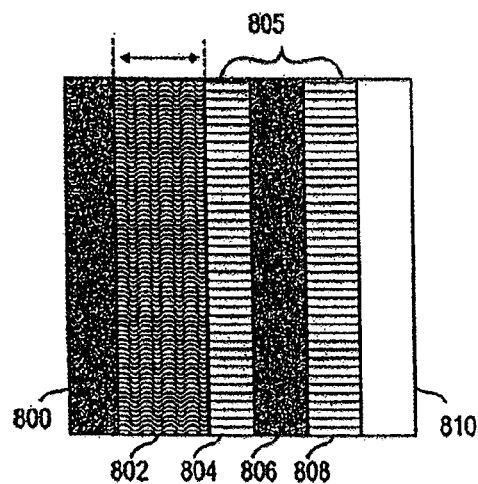
FIG. 8 is a diagram of layers of a modulator.

Referring to FIG. 8, reflector 800 (the transformed film) is separated from induced absorber 805 (the transformer), comprising films 804, 806, and 808, by variable thickness spacer 802. Incident medium 810 bounds the other side of induced absorber 805. Each of these thin films is micromachined in a fashion described in the parent patent application. Induced absorber 805 performs two functions. The first is to match the admittances of reflector 800 and incident medium 810. This is accomplished via matching layer 808, which is used to transform the admittance of absorber 806 to that of the incident medium 810, and via matching layer 804, which is used to transform the admittance of reflector 800 to that of absorber 806. The second function is the absorption of light. This is accomplished using absorber 806, which performs the function of attenuating light which is incident upon it through the medium, as well as light which is incident upon it from the reflector.

Figure 9:
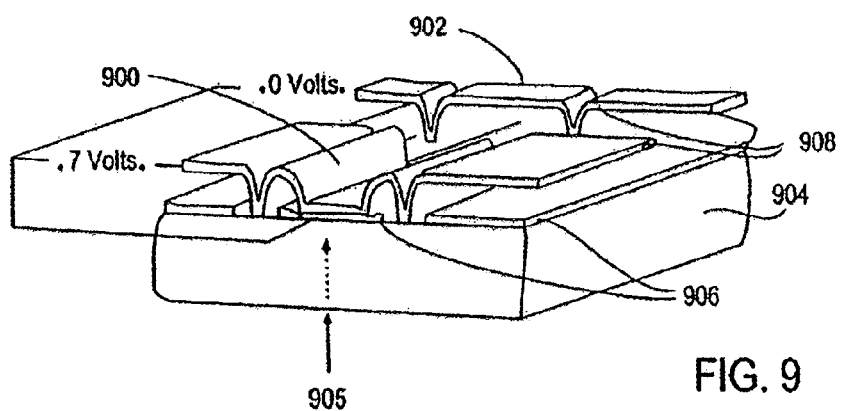
FIG. 9 is a perspective view of cavities in a device.

The ability to alter the thickness T of spacer 802 allows the optical characteristics of the entire structure to be modified. Referring to FIG. 9, pixel 900 is shown in the driven state and pixel 902 in the undriven state. In this case induced absorber 906 (the transformer) resides on substrate 904 and reflector 908 (the transformed film) is a self-supporting structure. Application of a voltage causes reflector 908 to come into contact or close proximity with induced absorber 906. Proper selection of materials and thickness will result in a complete transformation of the admittance of reflector 908 to that of substrate 904. Consequently, a range of frequencies of light 905, which is incident through substrate 904, will be significantly absorbed by the pixel. With no voltage applied, reflector 908 returns to its normal structural state which changes the relative admittances of the reflector and the substrate. In this state (pixel 902) the cavity behaves more like a resonant reflector, strongly reflecting certain frequencies while strongly absorbing others.

Figure 10:
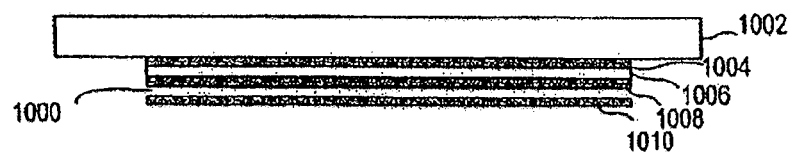
FIG. 10 is a diagram of a side view of a pixel device.
Figure 11:
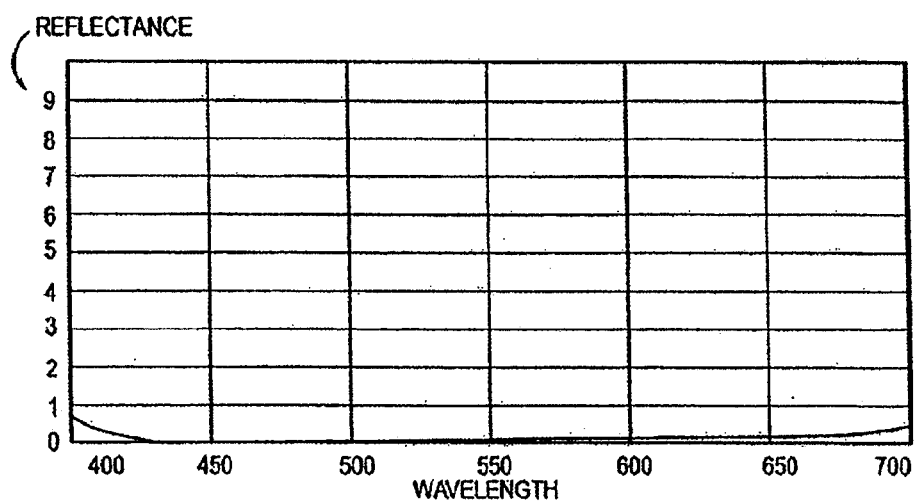
FIG. 11 is a graph of the optical response for a cavity which appears black.
Figure 12:
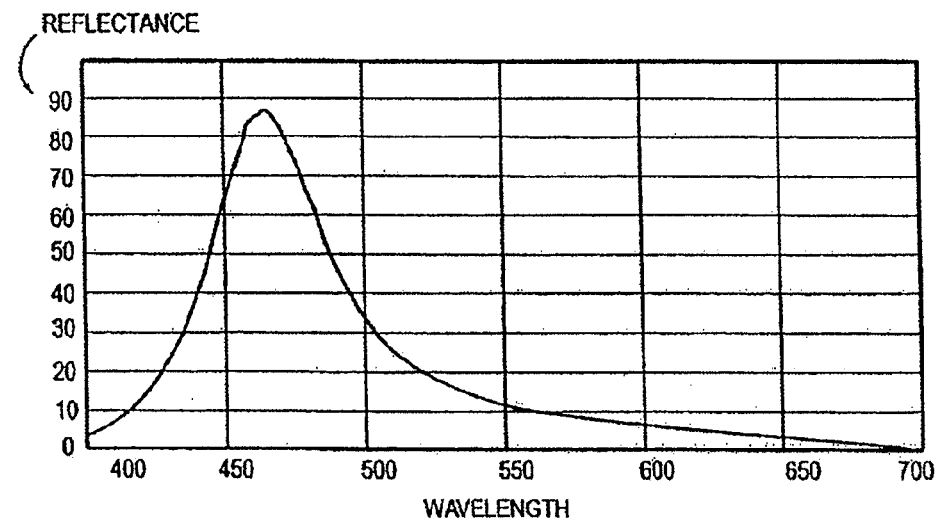
FIG. 12 is a graph of the optical response for a cavity which appears blue.
Figure 13:
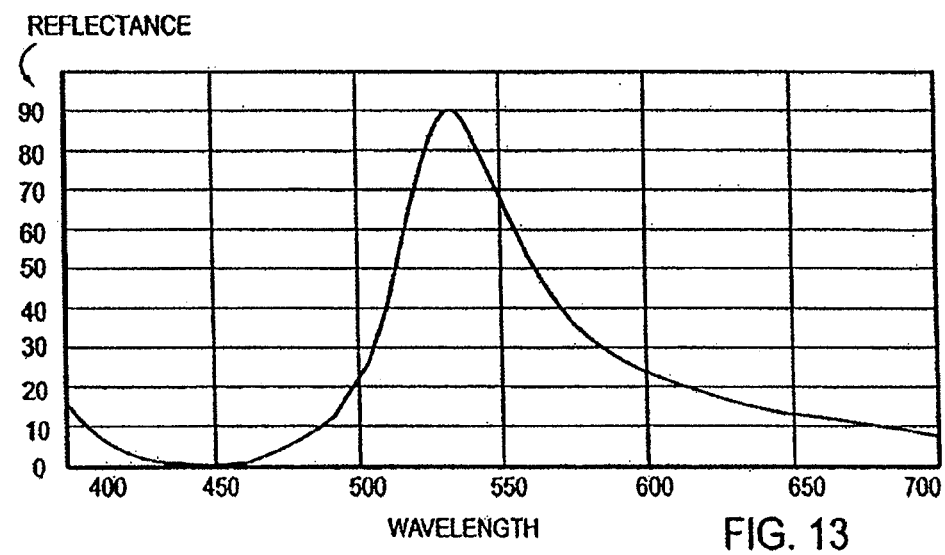
FIG. 13 is a graph of the optical response for a cavity which appears green.
Figure 14:
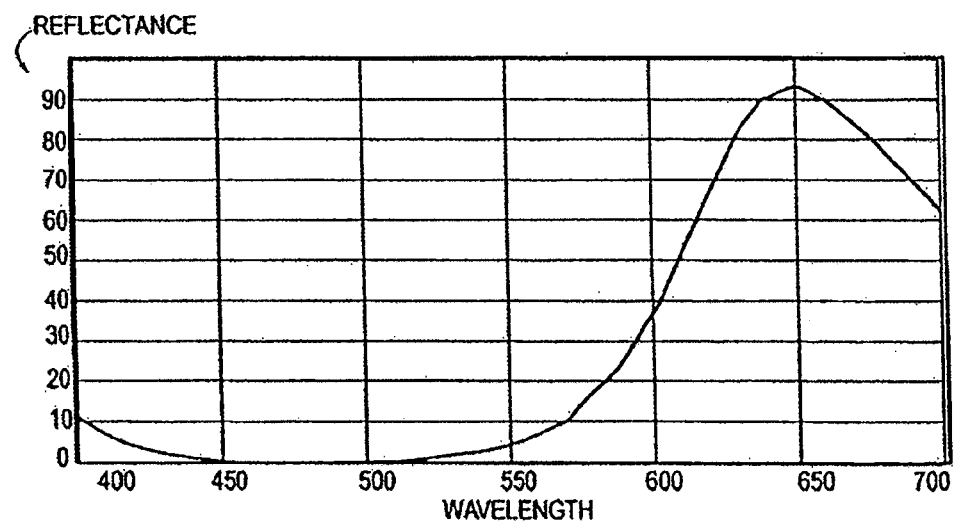
FIG. 14 is a graph of the optical response for a cavity which appears red.
Figure 15:
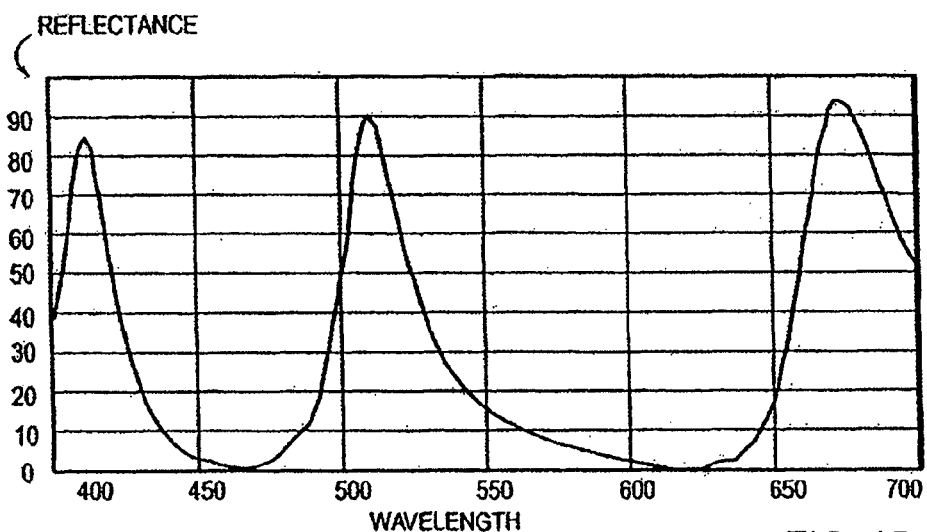
FIG. 15 is a graph of the optical response for a cavity which appears white.

Proper selection of materials thus allows for the fabrication of pixels which can switch from reflecting any color (or combination of colors) to absorbing (e.g., blue to black), or from reflecting any color combination to any other color (e.g., white to red). Referring to FIG. 10, in a specific pixel design, substrate 1002 is glass, matching layer 1004 is a film of zirconium dioxide which is 54.46 nm thick, absorber 1006 is a tungsten film 14.49 nm thick, matching layer 1008 is a film of silicon dioxide 50 nm thick, spacer 1000 is air, and reflector 1010 is a film of silver at least 50 nm thick. Referring to FIG. 1 the optical response of the pixel is shown in the driven state, i.e., when reflector 1010 is in contact with matching layer 1008 resulting in a broad state of induced absorption. Referring to FIGS. 12-15, the different color pixels are shown in respective undriven states which correspond to the reflection of blue, green, red, and white light, respectively. These responses correspond to undriven spacer thicknesses of 325, 435, 230, and 700 nm, respectively.

Figure 16:
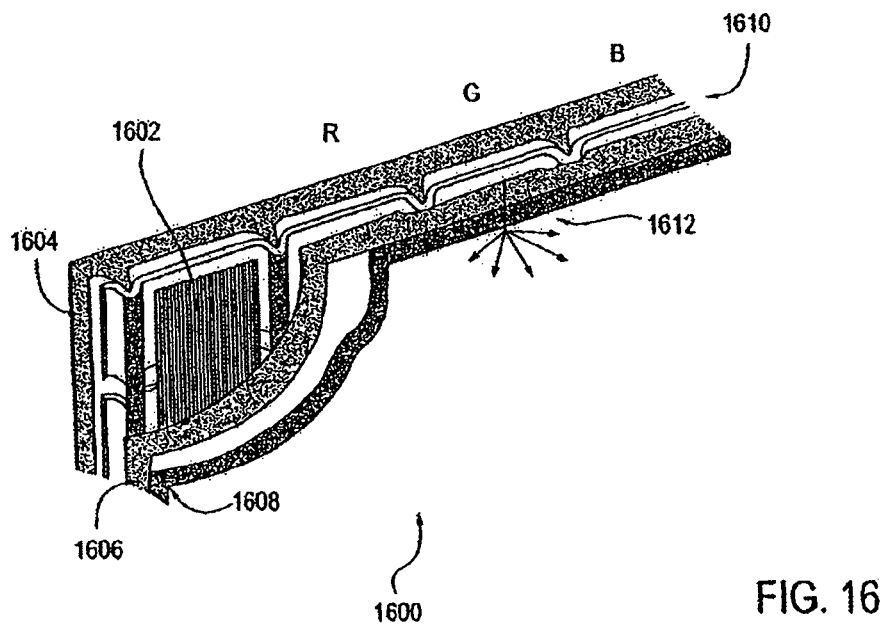
FIG. 16 is a perspective view of a fragment of a reflective flat panel display.

Referring to FIG. 16, a section of full color reflective flat panel display 1600 includes three kinds of pixels, R, G, and B. Each kind differs from the others only in the size of the undriven spacer which is determined during manufacture as described in the parent patent application. Induced absorber 1602 resides on substrate 1606, and reflector 1610 is self-supporting. Monolithic backplate 1604 provides a hermitic seal and can consist a thick organic or inorganic film. Alternatively, the backplate may consist of a separate piece, such as glass, which has been aligned and bonded to the substrate. Electrodes may reside on this backplate so that the electromechanical performance of the pixels may be modified. Incident light 1612 is transmitted through optical compensation mechanism 1608 and substrate 1606 where it is selectively reflected or absorbed by a pixel. The display may be controlled and driven by circuitry of the kind described in the parent patent application.

Optical compensation mechanism 1608 serves two functions in this display. The first is that of mitigating or eliminating the shift in reflected color with respect to the angle of incidence. This is a characteristic of all interference films and can be compensated for by using films with specifically tailored refractive indices or holographic properties, as well as films containing micro-optics; other ways may also be possible. The second function is to supply a supplemental frontlighting source. In this way, additional light can be added to the front of the display when ambient lighting conditions have significantly diminished thus allowing the display to perform in conditions ranging from intense brightness to total darkness. Such a frontlight could be fabricated using patterned organic emitters or edge lighting source coupled to a micro-optic array within the optical compensation film; other ways may also be possible.

The general process for fabrication of the devices is set forth in the parent patent application. Additional details of two alternative ways to fabricate spacers with different sizes are as follows; other ways may also be possible.

Both alternative processes involve the iterative deposition and patterning of a sacrificial spacer material which, in the final step of the larger process is, etched away to form an air-gap.

Figure 17A:
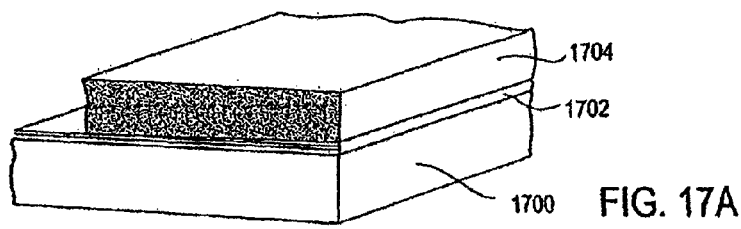
FIGS. 17A, 17B, 17C, and 17D are perspective views of different spacers during fabrication.
Figure 17B:
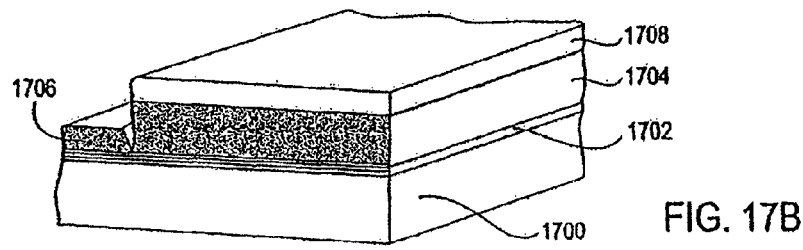
Figure 17C:
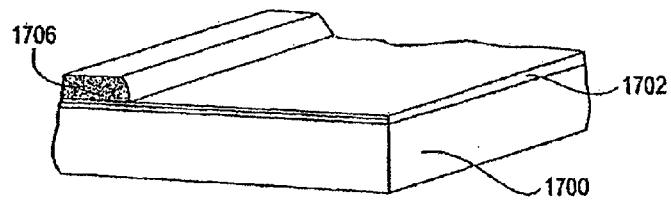
Figure 17D:
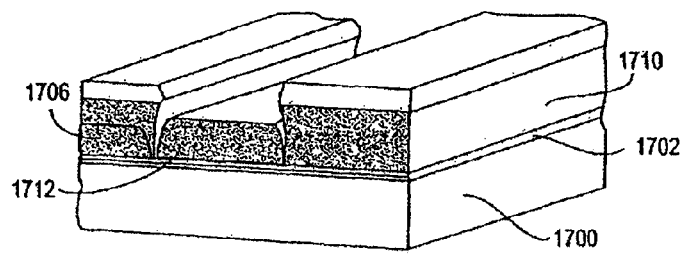

Referring to FIG. 17A, substrate 1700 is shown with induced absorber 1702 already deposited and photoresist 1704 deposited and patterned. Induced absorber 1702 is deposited using any number of techniques for think film deposition including sputtering and e-beam deposition. The photoresist is deposited via spinning, and patterned by overexposure to produce a natural overhang resulting in a stencil. The result is that it may be used to pattern subsequently deposited materials using a procedure known as lift-off. Referring to FIG. 17B, spacer material 1706 has been deposited, resulting in excess spacer material 1708 on top of the stencil. Referring to FIG. 17C, the stencil along with the excess spacer material have been lifted off by immersing the device in a bath of solvent such as acetone and agitating it with ultrasound. Referring to FIG. 17D, the process has begun again with new photoresist 1710 having been deposited patterned in a fashion such that new spacer 1712 is deposited adjacent to the old spacer 1706. Repeating the process once more results in spacers with three different thicknesses. Referring to FIG. 17D, the process has begun again with new photoresist 1710 having been deposited patterned in a fashion such that new spacer 1712, with a different thickness, is deposited adjacent to the old spacer 1706.

Figure 18A:
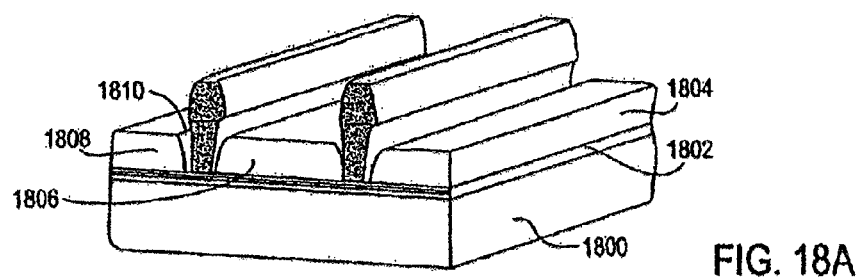
FIGS. 18A, 18B, 18C, and 18D are also perspective views of different spacers during fabrication.
Figure 18B:
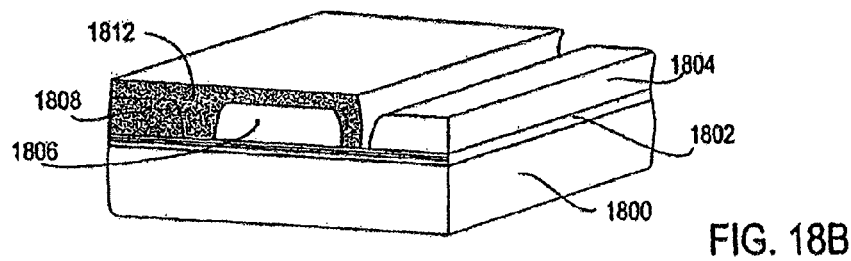
Figure 18C:
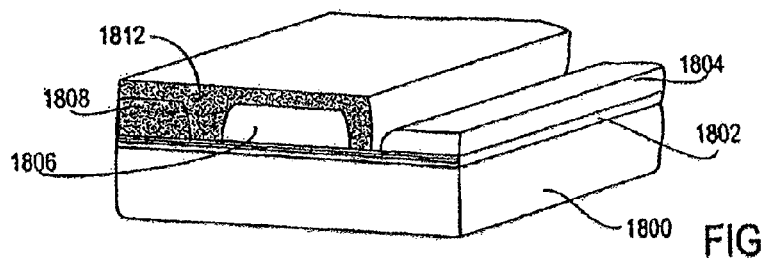
Figure 18D:
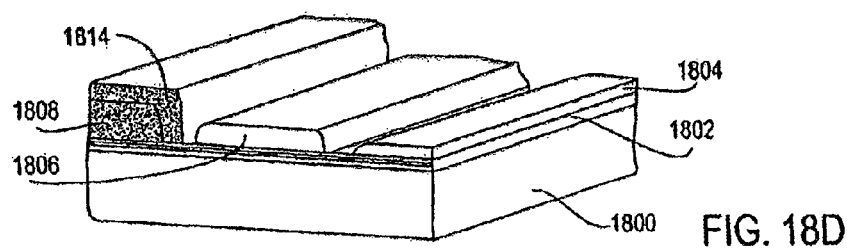

Referring to FIG. 18A, substrate 1800 is shown with induced absorber 1802 already deposited. Spacer materials 1804, 1806, and 1808 have also been deposited and patterned by virtue of lift-off stencil 1810. The spacer materials have a thickness corresponding to the maximum of the three thicknesses required for the pixels. Referring to FIG. 18B, the stencil along with the excess material has been lifted off and new photoresist 1812 has been deposited and patterned such that spacer 1804 has been left exposed. Referring to FIG. 18C, spacer material 1804 has been etched back via one of a number of techniques which include wet chemical etching, and reactive ion etching. Only a portion of the required spacer material is etched away, with the remainder to be etched in a subsequent etch step. Photoresist 1812 is subsequently removed using a similar technique, Referring to FIG. 18D, new photoresist 1814 has been deposited and patterned exposing spacers 1804 and 1806. The entire etch of spacer 1806 is performed in this step, and the etch of spacer 1804 is completed. Photoresist 1814 is subsequently removed and the process is complete.

Other embodiments are within the scope of the following claims.

For example, the spacer material need not ultimately be etched away but may remain instead a part of the finished device. In this fashion, and using the previously described patterning techniques, arbitrary patterns may be fabricated instead of arrays of simple pixels. Full color static graphical images may thus be rendered in a method which is analogous to a conventional printing process. In conventional printing, an image is broken up into color separations which are basically monochrome graphical subsets of the image, which correspond to the different colors represented, i.e., a red separation, a blue separation, a green separation, and a black separation. The full-color image is produced by printing each separation using a different colored ink on the same area.

Alternatively, in a process which we will call "Iridescent Printing", the different separations are composed of layers of thin films which correspond to the IMod design described here and those in the referenced patent. Patterning or printing a combination of colors or separations on the same area, allows for brilliant full-color images to be produced.

Figure 19A:
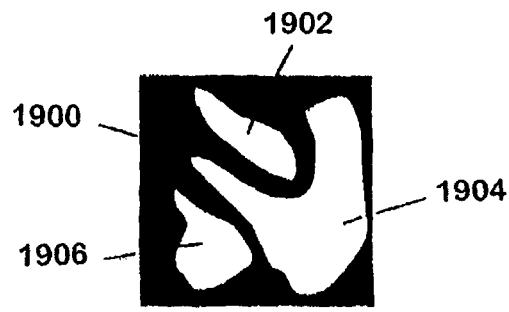
FIGS. 19A, 19B, 19C, 19D are top views of a static graphic image.
Figure 19B:
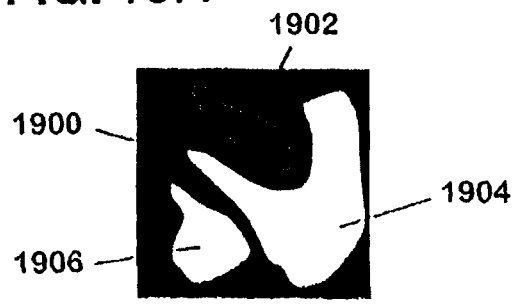
Figure 19C:
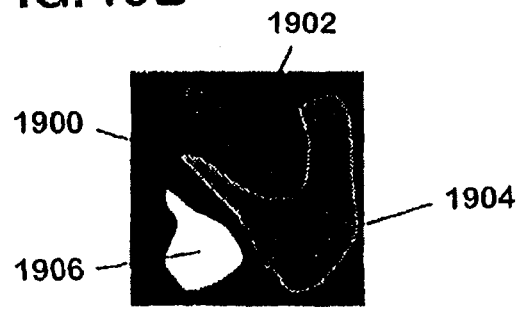
Figure 19D:
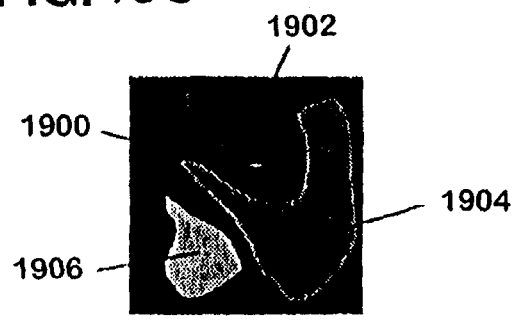

Referring to FIG. 19A, a square substrate is shown with area 1900 representing the portion of the substrate which has been patterned with a thin film stack optimized for black. Referring to FIG. 19B, the substrate has been subsequently patterned with a thin film stack optimized for red in area 1902. Referring to FIG. 19C, the substrate has been subsequently patterned with a thin film stack optimized for green in area 1904. Referring to FIG. 19D, the substrate has been subsequently patterned with a think film stack optimized for blue in area 1906.

Alternatively, a simpler process can be obtained if only the induced absorber design is used. In this process, the entire substrate is first coated with the induced absorber stack. Subsequent steps are then used to pattern the spacer material only, using the aforementioned techniques. After the desired spacers, i.e., colors are defined, a final deposition of a reflector is performed.

The brightness of different colors can be altered by varying the amount of black interspersed with the particular color, i.e., spatial dithering. The images also exhibit the pleasing shift of color with respect to viewing angle known as iridescence.

In another example, a reflective flat panel display may also be fabricated using a single kind of pixel instead of three. Multiple colors, in this case, are obtained through fabricating the pixels in the form of continuously tunable or analog interferometric modulators as described in the parent patent application. In this fashion, any individual pixel may, by the application of the appropriate voltage, be tuned to reflect any specific color. This would require that the array be fabricated on a substrate along with electronic circuitry, or directly on the surface of an integrated circuit, in order to provide a charge storage mechanism. This approach, though it requires a more complicated driving scheme relying on analog voltages, provides superior resolution. It would also find application in a projection system.

Other embodiments are within the scope of the following claims.

The invention claimed is:

1. A display device, comprising:
   a substrate;
   first and second means for reflecting light defining an interferometric light modulation cavity therebetween, wherein the first and second means for reflecting light are conductive and movable with respect to the substrate; and
   first and second means for causing movement of the first and second reflecting means.

2. The device of claim 1, wherein each of the first and second means for reflecting light comprises an at least partially reflective layer.

3. The device of claim 1, wherein each of the first and second means for causing movement comprises an electrode.

4. The device of claim 1, wherein the first and second means for causing movement are adjacent to one another.

5. The device of claim 1, wherein the first and second means for reflecting light are substantially parallel.

6. The device of claim 1, wherein a first edge of the first means for causing movement and a first edge of the second means for causing movement are substantially parallel.

7. The device of claim 1, wherein the first and second means for causing movement are substantially rectangular.

8. The device of claim 1, wherein the wavelength of reflected light depends on a height of the cavity.

9. The device of claim 1, wherein the first and second means for causing movement are positioned on the same means for reflecting light.

10. The device of claim 1, further comprising:
    third and fourth means for reflecting light, the third and fourth reflecting means defining an additional interferometric light modulation cavity, wherein the third reflecting means forms a means for causing relative movement between the third reflecting means and the substrate; and
    third and fourth substantially coplanar means for causing relative movement of the third reflecting means and the substrate.

11. The device of claim 1, wherein the first and second means for causing movement are substantially coplanar.

12. A display device comprising:
    a substrate;
    a first reflective electrode, and a first layer configured to move, cooperatively defining an interferometric light modulation cavity, wherein the first reflective electrode is movable with respect to the substrate; and
    first and second electrodes associated with the cavity, wherein at least one of the first and second electrodes is configured to cause a relative movement of the first reflective electrode and the substrate.

13. The device of claim 12, wherein the first and second electrodes are within the cavity.

14. The device of claim 12, wherein the device comprises a MEMS device.

15. The device of claim 12, wherein the first and second electrodes are adjacent to one another.

16. The device of claim 12, wherein a first edge of the first electrode and a first edge of the second electrode are substantially parallel.

17. The device of claim 12, wherein the first and second electrodes are substantially rectangular.

18. The device of claim 12, wherein the first layer is at least partially reflective.

19. The device of claim 12, wherein the wavelength reflected depends on a height of the cavity.

20. The device of claim 12, wherein the first and second electrodes are positioned on the first layer.

21. The device of claim 12, further comprising:
    a second reflective electrode and a second layer cooperatively defining an additional interferometric light modulation cavity, wherein the second reflective electrode is movable with respect to the substrate; and
    third and fourth substantially coplanar electrodes associated with the additional cavity, wherein at least one of the third and fourth electrodes is configured to cause a relative movement of the second reflective electrode and the substrate, and wherein the device is configured to display an image.

22. The device of claim 12, wherein the first and second electrodes are substantially coplanar.

23. A display device comprising:
    a substrate;
    a first reflective electrode and a first layer cooperatively defining an interferometric light modulation cavity, wherein the first reflective electrode is movable with respect to the substrate;
    first and second electrodes associated with the cavity, wherein at least one of the first and second electrodes is configured to cause a relative movement of the first reflective electrode and the substrate;
    a second reflective electrode and a second layer cooperatively defining an additional interferometric light modulation cavity, wherein the second reflective electrode is movable with respect to the substrate; and
    third and fourth substantially coplanar electrodes associated with the additional cavity, wherein at least one of the third and fourth electrodes is configured to cause a relative movement of the second reflective electrode and the substrate, and wherein the device is configured to display an image.

* * * * *